United States Patent [19]
Trompower

[11] Patent Number: 6,047,175
[45] Date of Patent: Apr. 4, 2000

[54] WIRELESS COMMUNICATION METHOD AND DEVICE WITH AUXILIARY RECEIVER FOR SELECTING DIFFERENT CHANNELS

[75] Inventor: Michael L. Trompower, Navarre, Ohio

[73] Assignee: Aironet Wireless Communications, Inc., Fairlawn, Ohio

[21] Appl. No.: 08/715,868

[22] Filed: Sep. 19, 1996

Related U.S. Application Data

[63] Continuation-in-part of application No. 08/672,426, Jun. 28, 1996.

[51] Int. Cl.[7] .................................................. H04Q 7/00
[52] U.S. Cl. ............................ 455/422; 455/434; 455/450
[58] Field of Search .................................. 455/422, 509, 455/436, 443, 524, 412, 438, 464, 450, 434; 375/200, 202; 370/332

[56] References Cited

U.S. PATENT DOCUMENTS

| | | | |
|---|---|---|---|
| 4,216,432 | 8/1980 | Imazeki et al. | 455/79 |
| 4,792,984 | 12/1988 | Matsuo . | |
| 5,101,501 | 3/1992 | Gilhousen et al. . | |
| 5,142,550 | 8/1992 | Tymes . | |
| 5,230,082 | 7/1993 | Ghisler et al. . | |
| 5,267,262 | 11/1993 | Wheatley, III . | |
| 5,287,384 | 2/1994 | Avery et al. . | |
| 5,361,399 | 11/1994 | Linquist et al. . | |
| 5,386,435 | 1/1995 | Cooper et al. . | |
| 5,390,366 | 2/1995 | Kasugai . | |
| 5,442,627 | 8/1995 | Viterbi et al. . | |
| 5,452,471 | 9/1995 | Leopold et al. . | |
| 5,475,864 | 12/1995 | Hamabe | 455/33.1 |
| 5,483,666 | 1/1996 | Yamada et al. | 455/33.1 |
| 5,506,867 | 4/1996 | Kotzin et al. . | |
| 5,539,923 | 7/1996 | Matsumoto . | |
| 5,546,397 | 8/1996 | Mahany . | |
| 5,594,949 | 1/1997 | Andersson et al. | 455/62 |
| 5,640,414 | 6/1997 | Blakeny, II et al. . | |
| 5,697,055 | 12/1997 | Gilhousen et al. . | |
| 5,701,590 | 12/1997 | Fujinami . | |
| 5,794,145 | 8/1998 | Milam | 455/426 |
| 5,825,764 | 10/1998 | Rudolph . | |

*Primary Examiner*—Dwayne D. Bost
*Assistant Examiner*—Linwood C. Scott, Jr.
*Attorney, Agent, or Firm*—Arter & Hadden LLP

[57] ABSTRACT

A wireless communication device and method which includes the introduction of a auxiliary receiver or transceiver which is included in a base station or mobile terminal in addition to a transceiver used to communicate between devices. The auxiliary receiver or transceiver serves to monitor conditions on available communication channels other than the channel currently being utilized for communication between devices.

18 Claims, 13 Drawing Sheets

| CHANNEL | RSSI Avg. for Most Recent Sample (Non-Correlated) | RSSI Avg. for Most Recent Sample (Correlated) | RSSI Avg. for Most Recent Five Samples (Non-Correlated) | RSSI Avg. for Most Recent Five Samples (Correlated) | Beacon Received During Most Recent Sample? (Yes/No) |
|---|---|---|---|---|---|
| A | | | | | |
| B | | | | | |
| C | | | | | |
| D | | | | | |
| E | | | | | |

Fig. 3

WIRELESS COMMUNICATION METHOD AND DEVICE WITH AUXILIARY RECEIVER FOR SELECTING DIFFERENT CHANNELS

CROSS-REFERENCE TO RELATED APPLICATION

This application is a continuation-in-part of U.S. patent app. Ser. No. 08/672,426, filed on Jun. 28, 1996.

TECHNICAL FIELD

The present invention relates generally to wireless communication systems, and more particularly to a device used therein including an auxiliary receiver for selecting different channels.

BACKGROUND OF THE INVENTION

In recent years, the use of cellular communication systems having mobile terminals which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects.

A typical cellular communication system includes a number of fixed base stations or access points interconnected by a system backbone. Also included in many cellular communication systems are intermediate base stations which are not directly connected to the system backbone. Intermediate base stations, often referred to as wireless base stations or repeaters, increase the area within which base stations connected to the system backbone can communicate with mobile terminals.

Associated with each base station is a geographic cell. A cell is a geographic area in which a base station has sufficient signal strength to transmit and receive data from a mobile terminal or other device with an acceptable error rate. Typically, base stations will be positioned along the backbone such that the combined cell area coverage from each base station provides full coverage of a building or site. Further, it is also typical to have the cell area of coverage from two or more base stations to overlap or be colocated.

Wireless communication systems such as those described above require that a base station and a mobile terminal communicate on the same frequency channel in order to exchange information. Often times, the noise level on a particular channel may become excessive and therefore a base station, for example, will initiate a move to a different frequency channel where better system performance can be achieved. Prior to changing to a different frequency channel, however, the base station must go off-line from its current channel to search for other channel candidates and to evaluate the current noise conditions of those channels. Unfortunately, by going off-line the base station can no longer communicate with other devices on what had been the current channel utilized by the base station. As a result, communications between the base station and any mobile terminals registered thereto are suspended so as to reduce overall system performance.

As an example, in a known frequency agile direct sequence spread spectrum (DSSS) system a base station is able to select among a plurality (e.g., five) of available channels on which to communicate. On occasion, the base station may determine that the noise conditions on the current channel are too high for reliable communications and therefore decide to move to a new channel among the available channels. In order to determine which channel to move to, the base station broadcasts a message to be received by all mobile terminals registered to the base station indicating that the base station will be going temporarily off-line. This avoids the possibility of a mobile terminal transmitting information to the base station during such a time when the base station is not configured to receive such information. The base station then utilizes its transceiver to scan communication conditions (e.g., noise conditions) on all other available channels.

Based on such analysis, the base station then determines whether it is desirable to change to a new channel which may offer improved communication conditions (e.g., lower noise conditions). If more favorable conditions are available on another channel, the base station then returns to the original channel and attempts to inform all mobile terminals to jump to the newly selected channel. Otherwise, the base station simply remains on the original channel and informs the mobile terminals that the base station is back on line.

There are, however, a number of drawbacks associated with such an approach for determining to which channel the base station should change, if at all. The requirement that the base station go off-line in order to search for other channels significantly reduces overall system performance. Additionally, the base station typically assesses the noise conditions on each of the other channels over a short period of time and often leads to skewed results when, for instance, noise conditions are high or low on a particular channel due to conditions which are only temporary. Similar difficulties also exist for mobile terminals which evaluate the noise conditions in order to initiate channel switching.

In view of the aforementioned shortcomings associated with conventional communication systems involving different channels on which the base stations and mobile terminals may communicate, there is a strong need in the art for a system and method for minimizing loss in system performance associated with devices initiating a change in communication channels. Further, there is a strong need in the art for a system and method of changing channels utilizing information which accounts for temporary fluctuations in the communication conditions on other channels.

SUMMARY OF THE INVENTION

The wireless communication device and method according to the present invention minimizes the aforementioned problems associated with searching for a new channel. Specifically, the present invention introduces an auxiliary receiver or transceiver which is included in a base station or mobile terminal in addition to a transceiver used to communicate between devices. The auxiliary receiver or transceiver serves to monitor substantially continuously the noise conditions on available communication channels other than the channel currently being utilized for communication between devices. Whenever the noise conditions on the current channel goes above a preset threshold level, for example, the base station or mobile terminal is informed by virtue of the operation of the auxiliary receiver or transceiver as to the best alternative channel to which to change. Alternatively, even if the noise conditions on the present channel are not above a predetermined threshold, the base station or mobile terminal still may change to another channel if there is significantly less noise on another channel. Further, since the auxiliary receiver or transceiver can substantially continuously monitor all other channels, an average noise condition can be determined so that temporary noise conditions on a given channel do not skew the selection process.

According to another embodiment, the auxiliary receiver is able to identify quickly other available channels using a set of selectable filters. By selecting among filters with different bandwidths, the auxiliary receiver in combination with microprocessor control is able to deduce rapidly which channels are available and which channels are being used and/or are experiencing noise. Furthermore, the auxiliary receiver may identify alternative channels by way of evaluating communications based on a plurality of different known PN code sequences and/or chipping rates. The auxiliary receiver also may look for different modulation schemes on various channels such as BPSK or QPSK. The auxiliary receiver is further able to evaluate channel usage in different frequency bands.

In accordance with one particular aspect of the invention, a wireless communication device is provided. The device includes a transceiver including a transmitter and a receiver for transmitting and receiving wireless communications selectively on any of a plurality of channels; and an auxiliary receiver for evaluating communication conditions on at least one of the plurality of channels while the transceiver communicates on another of the plurality of channels, and for providing information based on the communication conditions to the transceiver; wherein the auxiliary receiver is operatively configured to evaluate the communication conditions by selectively evaluating at least one of different frequency bands, PN code sequences, chipping rates, and modulation complexities.

In accordance with yet another aspect of the invention, in a wireless communication device including a transceiver having a transmitter and a receiver for transmitting and receiving wireless communications on any of a plurality of channels, and an auxiliary receiver, a method for communicating is provided. The method includes the steps of: the transceiver communicating on a channel selected from the plurality of channels; the auxiliary receiver evaluating communication conditions on each of the plurality of channels while the transceiver communicates on the selected channel, and selecting another channel for the transceiver to communicate on from among the plurality of channels based on the information provided by the auxiliary receiver, wherein the auxiliary receiver is operatively configured to evaluate the communication conditions by selectively evaluating at least one of different frequency bands, PN code sequences, chipping rates, and modulation complexities.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3 is a table containing noise condition information which is maintained in memory based on information provided by the auxiliary receiver in accordance with the present invention;

DESCRIPTION OF THE PREFERRED EMBODIMENTS

Figure 1:
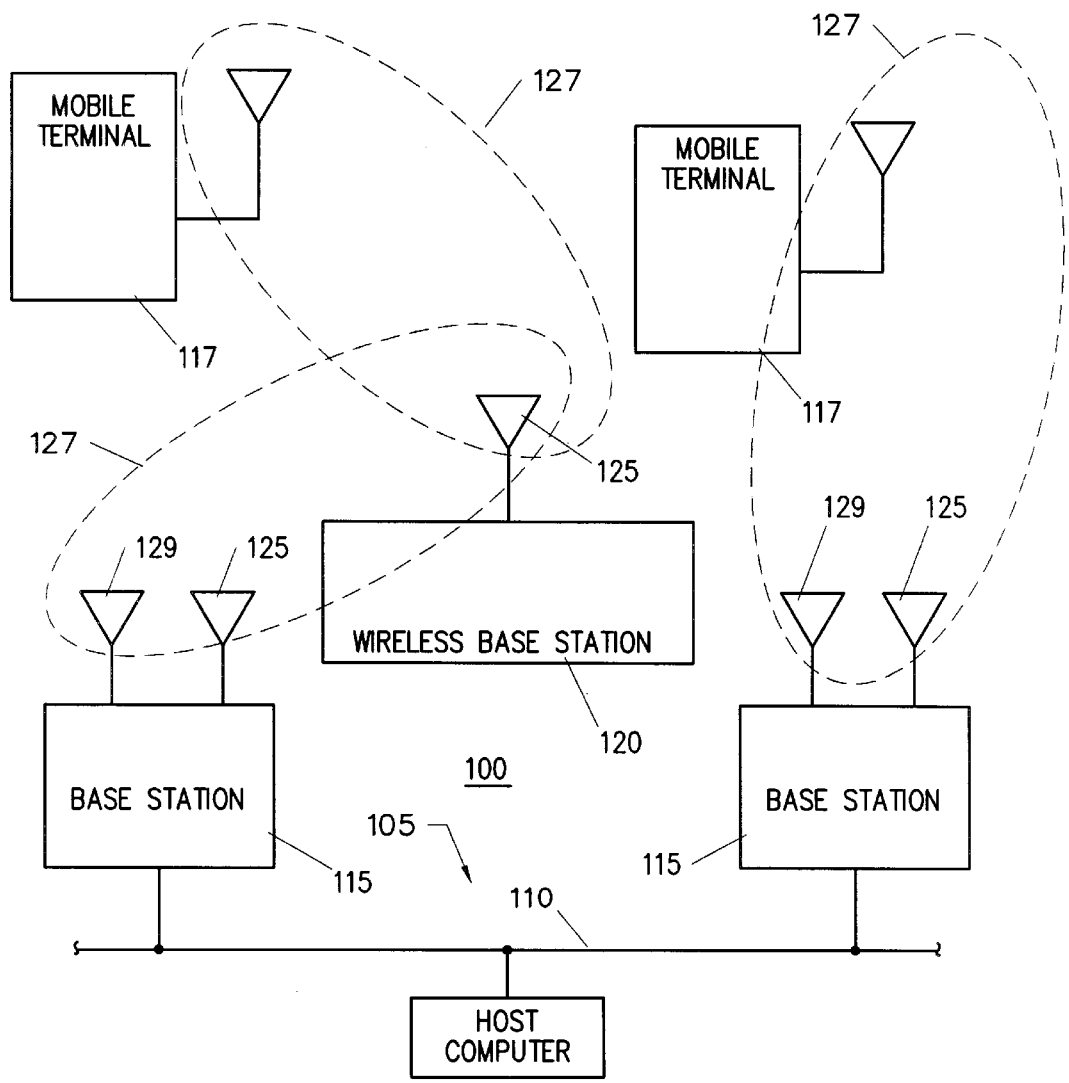
FIG. 1 is a block diagram of a wireless cellular communication system in accordance with the present invention.

The present invention will now be described with reference to the drawings, wherein like reference numerals are used to refer to like elements throughout. Referring initially to FIG. 1, a wireless network in the form of a cellular communication system 100 is shown in accordance with the exemplary embodiment of the present invention. The cellular communication system 100 includes a local area network 105 having a system backbone 110 and a plurality of base stations 115 coupled thereto. The backbone 110 is shown to be a hardwired data communication path made of twisted pair cable, shielded coaxial cable or fiber optic cable, for example. Alternatively, the backbone 110 could be wireless in nature so as to provide an added dimension of flexibility. As is conventional, each base station 115 serves as an access point through which wireless communications may occur between devices coupled to the system backbone 110 and one or more mobile terminals 117 included in the system 100.

In the exemplary embodiment, the system 100 is a direct sequence, spread spectrum (DSSS) system in which each of the base stations 115 is capable of communicating on any one of a plurality of channels at different respective frequencies. Thus, for example, if the noise level for a particular channel on which a base station 115 is operating becomes excessive, the base station 115 will determine whether to initiate a change to another channel found to have less noise. In this sense the system 100 is considered to be frequency agile whereby each base station 115 can selectively choose among a plurality of channels on which to operate. In the event a base station 115 initiates a change to another channel, the base station 115 communicates such information to any mobile terminals 117 which are registered to the base station 115. Each mobile terminal 117 is configured to adjust its own parameters accordingly so as to operate on the newly selected channel. For purposes of this invention, a channel is defined to include not only communication in different frequency bands, but also communication with different modulation complexities, chipping rates, PN codes, etc.

By way of example, each base station 115 together with the other devices in the system are designed to operate in either the 902–928 MHZ or 2.4–2.48 GHz bands. Such bands represent unlicensed bands provided by the FCC for low power communication devices in the U.S., although operation in other bands is certainly within the scope of the invention. Within each band there are five predefined channels A through E at different respective frequencies on which DSSS communications can be carried out. Each base station 115 is capable of selecting any one of the channels A through E on which to communicate as is discussed more fully below.

According to conventional DSSS techniques, communications involving the base stations 115 and mobile terminals 117 involve utilizing a predetermined spreading code known as a pseudo noise (PN) sequence to spread the data being transmitted. This involves spreading each data bit which is transmitted into a plurality of sub-bits, commonly referred to as chips, using the PN sequence. Data which is received is despread according to the same PN sequence.

In order to expand the effective communication range of the base stations 115, one or more wireless base stations 120 also may be included in the cellular communication system 100. As is conventional, each wireless base station 120 associates itself, typically by registration, with another base station, whether hardwired or wireless, such that a communication link is formed between itself and other devices situated on the system backbone 110.

Each base station 115, 120 is capable of wirelessly communicating with other devices in the system 100 via a respective antenna 125. A geographic cell 127 associated with each base station 115, 120 defines a region, or area of coverage, in which successful wireless communication may occur. Depending on the type of antenna 125 and the output power of the respective base station, the cell 127 may take one of several different forms and sizes. For example, in the event the antenna 125 is an omni-directional antenna, a generally spherical cell area coverage is obtained. However, a yagi-type antenna or other form of antenna with a generally directional area of coverage could also be used as will be readily appreciated.

According to the exemplary embodiment of the present invention, each base station 115 also includes an auxiliary antenna 129. The auxiliary antenna 129 preferably is of the same type as described above with reference to the antenna 125 and provides equivalent cell coverage 127. As is discussed more fully below, the auxiliary antenna 129 is coupled to an auxiliary receiver or transceiver included in the base station 115. The auxiliary receiver or transceiver is configured to operate substantially independently of a main transceiver also included in the base station 11 5 and which is used for carrying out conventional cellular communications. Specifically, the auxiliary receiver or transceiver in combination with the antenna 129 allows the base station 115 to scan substantially continuously the noise conditions of any or all of the available communication channels A through E to determine if, and when, the base station 115 may wish to switch from one channel to another. For example, if a base station 115 is currently operating on channel A and the auxiliary receiver determines that noise conditions on channel C are much lower, the base station 115 may initiate a change from channel A to channel C. Such configuration has advantages over prior art systems having only one transceiver and one antenna, in that the base station 115 is able to maintain continuous, uninterrupted communications with the mobile terminals 117 in its cell 127 area even during the scanning process.

As previously mentioned, the cellular communication system 100 includes one or more mobile terminals 117. Each mobile terminal 117 communicates with devices on the system backbone 110 via a selected base station 115, 120. Upon roaming from one cell 127 to another, the mobile terminal 117 is configured to associate itself with a new base station 115, 120.

Figure 2:
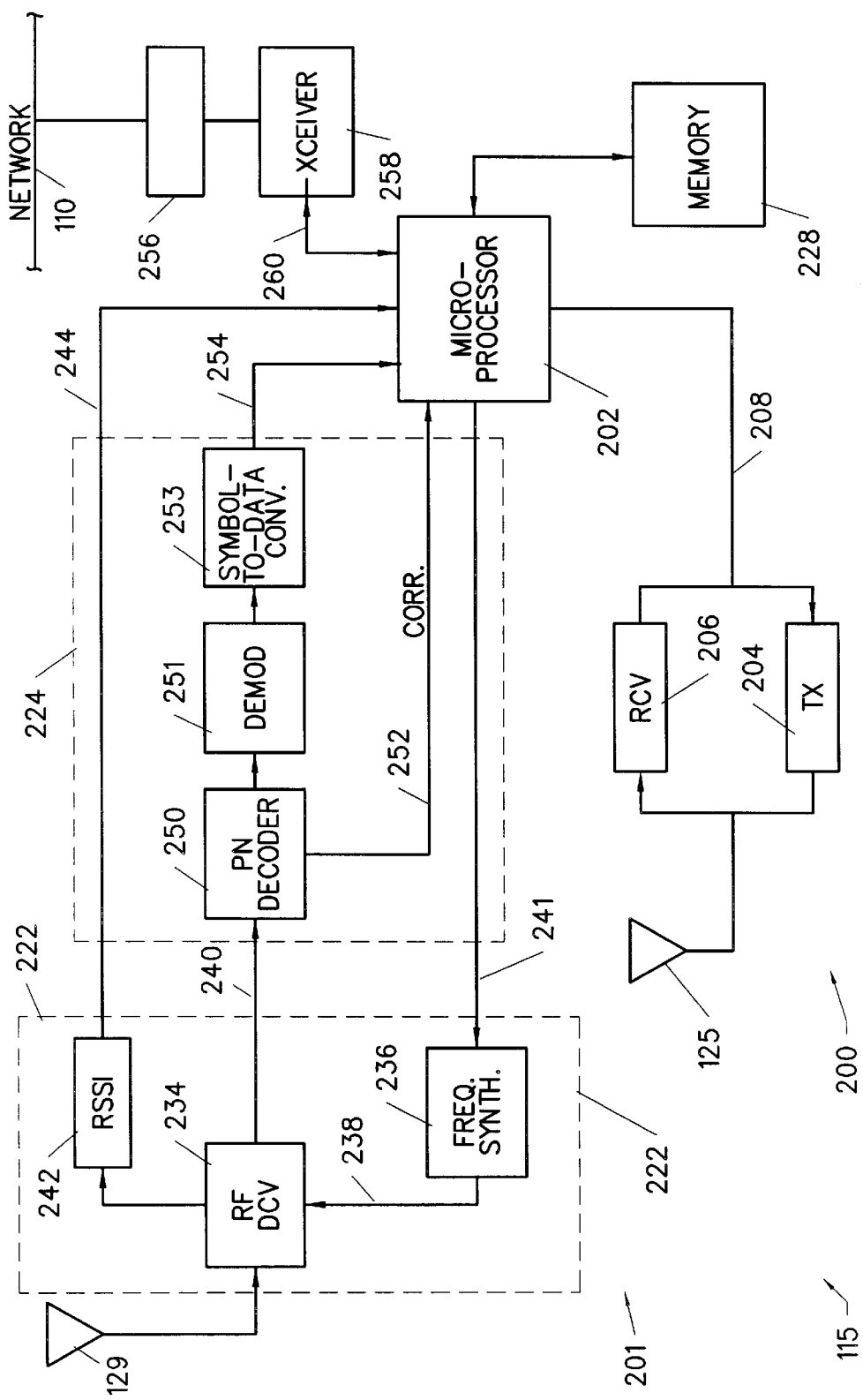
FIG. 2 is a block diagram of a base station including an auxiliary receiver in accordance with the present invention.

FIG. 2 represents a block diagram of a given base station 115 within the system 100. The base station includes a main transceiver 200 and an auxiliary receiver 201 which are each controlled by a microprocessor 202. The main transceiver 200 includes a transmitter 204 and a receiver 206 for respectively transmitting and receiving conventional cellular communications via the antenna 125. The transceiver 200 is conventional in design and is capable of operating on any one of five different channels A through E as controlled by the microprocessor 202. Control signals and data are exchanged between the microprocessor 202, the transmitter 204 and the receiver 206 by way of a control/data bus 208 connected therebetween. Since the particular design of the main transceiver 200 is generally conventional and is not necessarily germane to the present invention, further detail is omitted.

The auxiliary receiver 201 as shown in FIG. 2 is provided in the base station 115 to scan substantially continuously the channels A through E on which the main transceiver 200 is not currently operating on in order to evaluate noise conditions. Thus, the provision of the auxiliary receiver 201 avoids the necessity of the receiver 206 in the main transceiver 200 having to go 'off-line' with respect to the mobile terminals 117 in order to evaluate noise conditions on the other available channels as in conventional devices. Consequently, overall system performance is greatly enhanced as will be appreciated. The auxiliary receiver 201 includes a radio frequency (RF) section 222 and a demodulation section 224. As is described more fully below, the receiver 201 is controlled by the microprocessor 202 with respect to the operation of the RF section 222 and the demodulation section 224. A memory 228 such as a RAM or the like is also included in the base station 210 and can serve as data storage. In addition, the memory 228 includes a non-volatile portion for storing appropriate operating code to be executed by the microprocessor 202 for carrying out the functions described herein. The manner in which the microprocessor 202 can be programmed to carry out such functions will be readily apparent to those having ordinary skill in the art based on the description provided herein.

Signals which are received by the auxiliary antenna 129 are provided to an RF downconverter circuit 234 included in the RF section 222. The RF downconverter circuit 234 is driven by a frequency synthesizer 236 which produces an output frequency on line 238 which is input to the RF downconverter 234. The RF downconverter circuit 234 includes a mixer (not shown) which mixes the incoming signals from the antenna 129 down to a corresponding base band signal provided on line 240. The frequency synthesizer 236 is controllable by the microprocessor 202 via line 241 in order to control the specific channel on which the receiver 201 receives a signal. Specifically, the microprocessor 202 provides control information to the frequency synthesizer 236 which causes the synthesizer to selectively produce an output frequency on line 238 corresponding to the carrier frequency of any of channels A through E. Accordingly, by adjusting the output frequency of the frequency synthesizer 236 the microprocessor 202 can determine whether the receiver 201 receives signals on channel A, B, C, D or E.

The RF section 222 also includes a conventional received signal strength indicator (RSSI) circuit 242 which produces an output on line 244 indicative of the RSSI level of any signals received on a particular channel at a given time. The output of the RSSI circuit 242 is provided to the microprocessor 202 which samples the output as described below in order to evaluate the noise conditions of each particular channel A through E.

The base band signal provided on line 240 from the RF downconverter circuit 234 is input to a PN decoder circuit 250 included in the demodulation section 224. The PN decoder circuit 250 is designed to despread the signal from the RF downconverter circuit 234 according to the particular PN sequence utilized in the system 100. The actual PN sequence is not critical to the invention, although the PN decoder circuit 250 is designed to include an output on line 252 which is indicative of a degree of correlation between any data in the received signal and the PN sequence. As will be appreciated, as the receiver 201 receives signals on any given channel (i.e., channels A through E), the receiver 201 receives any noise which may be existent on the particular channel at that time. In addition, the receiver 201 may receive intelligible signals which are being transmitted from the base stations 115, 120 or mobile terminals within the system 100 and which happen to be operating on that particular channel. Thus, if the output on line 252 indicates a strong degree of correlation (correlated) it can be assumed that the received signal represents an intelligible signal and that a device within the system 100 currently is using that particular channel. If the output on line 252 indicates a low degree of correlation (non-correlated), this indicates that the received signal represents unintelligible noise. The output on line 252 is provided to the microprocessor 202 which utilizes such information in the manner described below to determine which, if any, channel to change to during operation. Although the preferred embodiment utilizes both the RSSI signal and the degree of correlation to determine which channel is best to be operating on, it should be appreciated that alternative embodiments may only use one or the other but not both.

The despread data which is output from the PN decoder 250 is provided to the input of demodulator circuit 251 which is designed to carry out on the received signal whatever particular type of demodulation is known to the system 100. For example, if the system 100 is configured to utilize binary phase shift keying (BPSK) modulation the demodulator circuit 251 is designed to demodulate the received signal according to BPSK techniques. Of course, other types of modulation could also be used without departing from the scope of the invention. The output of the demodulator 251 is provided to a symbol to data converter 253 which performs symbol to data conversion in accordance with the communication parameters of the system 100. Thus, the output of the symbol-to-data converter 253 on line 254 represents any system data which may have been included in the received signal. Such data is coupled to the microprocessor 202 where it is evaluated for content if desired.

The base station 115 in this embodiment includes a single microprocessor 202 which operates at a sufficiently high rate to control both the main transceiver 200 and the auxiliary receiver 201 substantially simultaneously (e.g., via multitasking). However, it will be appreciated that the transceiver 200 and receiver 201 could each have their own dedicated microprocessor for providing control. Information between the dedicated microprocessors can then be exchanged in order to control which particular channel the respective devices operate on.

The base station 115 is connected to the system backbone 110 via a connector 256. The connector 256 is connected to the backbone 110 at one end and to a network adapter transceiver 258 included in the base station 115 at the other end. The network adapter transceiver 258 is configured according to conventional network adapter transceiver techniques to allow the base station 115 to communicate over the network. The network adapter transceiver is coupled to the microprocessor 202 via line 260. Information received via the backbone 110 can be transmitted via the main transceiver 200 and vice versa.

FIG. 3 represents a table 264 maintained by the processor 202 in the memory 228. The table 264 contains noise condition information for each of the available channels A through E in the system 100. As is described below in connection with FIG. 4, the microprocessor 202 is programmed to cause the auxiliary receiver 201 to scan continuously through each of the channels A through E sampling the noise conditions on each of the channels on which the transceiver 200 is not operating. By simply adjusting the output of the frequency synthesizer 236 the auxiliary receiver 201 is controlled so as to receive incoming signals according to the sequence B, C, D, E, B, C, . . . , etc. assuming, for example, the transceiver 200 is operating on channel A. For each channel in the sequence, the microprocessor 202 is programmed to sample the RSSI signal on line 244 and the correlation output on line 252 for a sample time period of $T_{sample}$. The period $T_{sample}$ is preselected so as to be at least as long as the maximum time interval between any beacons which are transmitted by a given base station 115, 120 within the system. As is conventional, base stations 115, 120 in a passive scanning system broadcast packets known as beacons at periodically spaced time intervals which enable mobile terminals 117 to lock on to a base station and register therewith. In the exemplary embodiment the period $T_{sample}$ is one second, although other time periods are certainly possible.

The information obtained via the auxiliary receiver 201 from the RSSI level and correlation output samples from each channel is then maintained in the table 264. Further, the main transceiver 200 under the control of the microprocessor 202 periodically samples the RSSI level and correlation degree of the current channel on which the main transceiver 200 is operating. Such information is obtained by the receiver 206 in the same manner as done by the auxiliary receiver 201 with respect to the channels which the main transceiver 200 is not currently working on. This avoids the auxiliary receiver 201 having to spend time sampling noise conditions on the channel the main transceiver 200 is currently operating on; and since the main transceiver 200 already is on the current channel, there is no need for the main transceiver 200 to go "off-line" and change to another channel. Nevertheless, in another embodiment the auxiliary receiver 201 is responsible for obtaining the noise condition information with respect to all of the available channels.

The noise condition information obtained by the auxiliary receiver 201 for the other available channels and by the main receiver 206 for the current channel is provided to the microprocessor 202 which processes and stores the information in the table 264. More specifically, the table 264 includes five different rows corresponding to channels A through E, respectively. For each channel the table 264 includes information relating to the noise level thereof as determined by the RSSI level and correlation output from the PN decoder. Specifically, in column 266 the table includes the average RSSI level (e.g., in decibels) for the corresponding channel during the most recent sample period $T_{sample}$. However, the average RSSI level as stored in column 266 is calculated by the microprocessor 202 only for such times during the time period $T_{sample}$ that the correlation output on line 252 does not exceed a predetermined threshold (i.e., is considered non-correlated). Column 268 includes the average RSSI level as calculated by the microprocessor 202 during the most recent sample period $T_{sample}$, but in this case only for such times during the sample that the correlation output on line 252 is equal to or exceeds the predetermined threshold (i.e., is considered correlated). Such existence of a correlated signal is considered herein to be indicative of a use condition of a channel whereby the channel is actually in use by a device.

In order to detect the occurrence of temporary noise conditions on a particular channel, the table 264 also includes an average of the RSSI levels for both non-correlated and correlated signals over a predetermined number of most recent samples. For example, column 270 in the table 264 contains the average RSSI level over the five most recent samples of the respective channel as computed by the microprocessor 202 during such times when the correlation output on line 252 indicates a non-correlated signal. Similarly, column 272 contains the average RSSI level over the five most recent samples of the respective channel as computed by the microprocessor 202 during such times when the correlation output on line 252 indicates a correlated signal.

The table 264 also includes a column 274 which includes a flag for indicating whether a beacon was received during the most recent sample of the respective channel. As discussed above in relation to FIG. 2, in the event an intelligible signal is received by the auxiliary receiver 201, such signal is demodulated, decoded and converted in the modulation section 224. The information in the received signal is then provided to the microprocessor 202 via line 254. The microprocessor 202 is programmed to analyze the information received on line 254 to determine whether the received signal includes a beacon which was sent from another base station 115, 120 in the system 100. Such determination is based on conventional techniques including analyzing the appropriate data fields contained in the information provided on line 254. If a beacon is received on a particular channel during a time $T_{sample}$, this indicates that a base station 115, 120 within the system 100 is currently operating on the particular channel and is within the cell coverage of the present base station 115. Since it is desirable to avoid two or more base stations using the same channel within range of each other, a flag is set in column 274 to indicate whether a beacon has been received in the most recent sample. It is noted that such information is maintained only for the most recent sample since there is the possibility that the base station from which a previous beacon originated may itself have changed to another channel.

Figure 4:
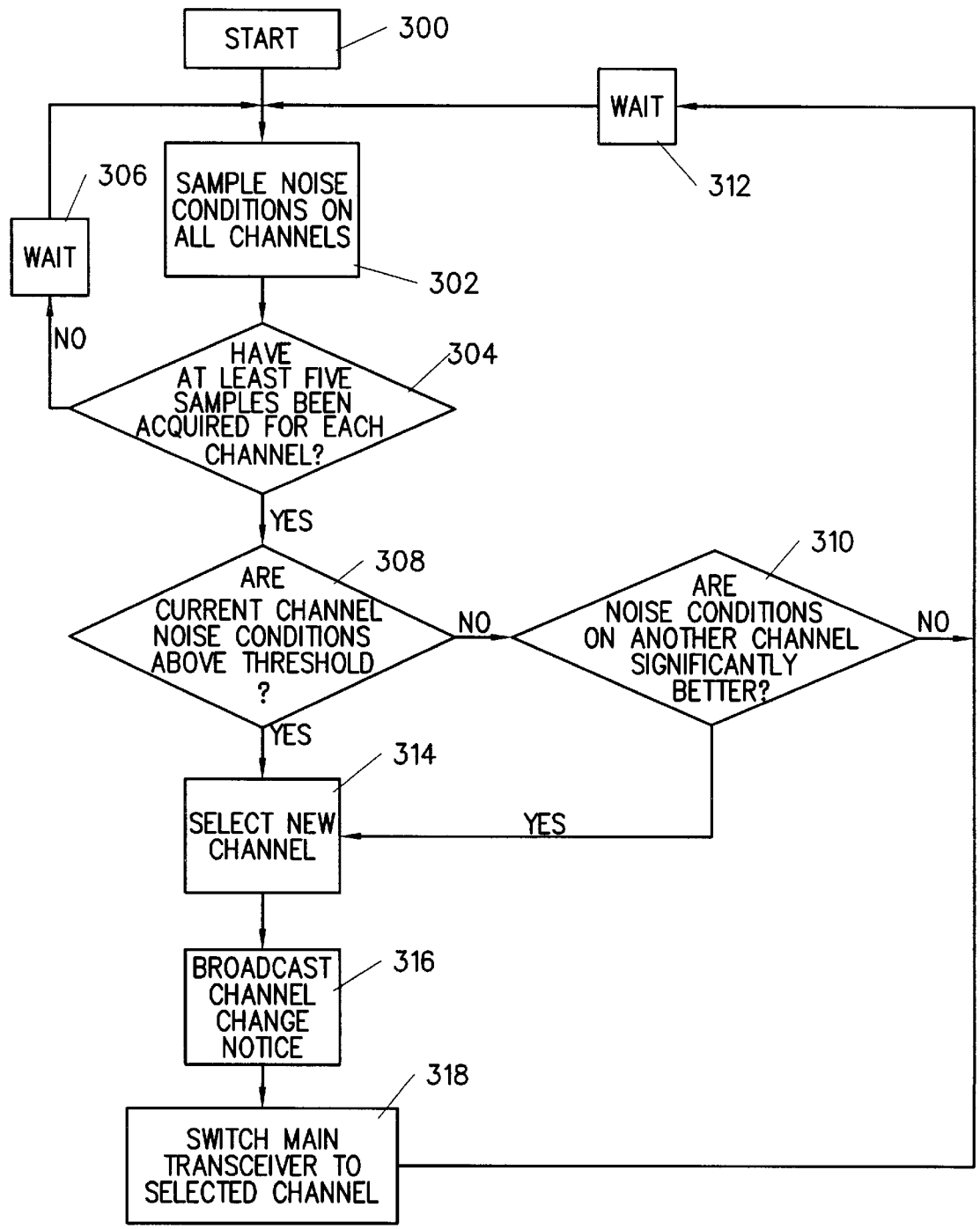
FIG. 4 is a flowchart suitable for programming the base station of FIG. 2 to select a new channel based on noise conditions in accordance with the present invention.

FIG. 4 is a flowchart representing the operation of the base station 115 with respect to monitoring the noise conditions of the available channels via the auxiliary receiver 201 and changing channels based thereon. Step 300 represents startup of the base station 115 in response to being powered up via an on/off switch or the like. During step 300 the base station 115 under the control of the microprocessor 202 carries out a self-initialization routine as is conventional. In addition, during step 300 the main transceiver 200 selects a default channel (e.g., channel A) on which to operate. Of course, in an alternative embodiment the main transceiver 200 may not select a default channel but rather may immediately perform a scan as discussed below to select on which channel to begin operations.

Following step 300, the microprocessor 202 proceeds to step 302 in which the auxiliary receiver 201 is utilized to obtain a sample of the RSSI level on line 244 and the correlation output on line 252 for each channel.

Specifically, if the main transceiver 200 is currently operating on channel A the microprocessor 202 controls the output frequency of the frequency synthesizer 236 such that a sample can be obtained by the auxiliary receiver 201 for each of channels B, C, D and E. The microprocessor 202 computes the average RSSI level for each sample for both the non-correlated and correlated signals and stores such information for each channel in the table 264 (FIG. 3) in columns 266 and 268, respectively. In addition, the microprocessor 202 in step 302 computes the average RSSI levels for the non-correlated and correlated signals over the past five samples for each channel and stores such information in columns 270 and 272, respectively. As mentioned above, identical information for channel A on which the transceiver 200 is currently operating on is obtained by the main receiver 206 and is also stored in the table 264. In the event the microprocessor 202 in step 302 has not yet obtained five samples for each channel, the average RSSI levels are computed based on the actual RSSI samples and a remaining number of phantom samples set to equal a total of five. Each phantom sample has an average RSSI level of zero, for example.

Furthermore, the microprocessor 202 in step 302 determines if a beacon was received on any of the channels during the samples taken in step 302. If yes, the microprocessor 202 sets a flag in column 274 indicating the same. If no, the microprocessor 202 resets a flag in column 274 so as to indicate such fact.

The microprocessor 202 then proceeds from step 302 to step 304 in which the microprocessor 202 determines whether at least five RSSI samples have been acquired for each channel. If no, the microprocessor 202 proceeds to step 306 in which the base station 115 pauses before returning to step 302 to obtain another RSSI sample from each channel A through E. The duration of the pause in step 306 can be anywhere from zero to several seconds, for example, depending on how often it is desired that the auxiliary receiver 201 update the noise condition information. In the exemplary embodiment, the microprocessor 202 pauses for five seconds in step 306 before returning to step 302.

If in step 304 the microprocessor 202 determines that at least five samples have been obtained for each of the channels A through E, the microprocessor 202 proceeds to step 308. In step 308, the microprocessor 202 is programmed to determine whether the noise conditions for the channel on which the main transceiver 200 is currently operating exceed a predetermined threshold level. More specifically, in step 308 the microprocessor 202 looks to the information in column 270 of table 264 to determine if the average RSSI level for non-correlated signals over the last five samples exceeds a predetermined threshold indicating noisy conditions. If the main transceiver 200 is currently operating on channel A, the microprocessor 202 will look to column 270 in relation to channel A. Similarly, if the main transceiver 200 is currently operating on one of the other channels, the microprocessor 202 compares the information for that particular channel with the predetermined threshold. If the noise conditions are above the threshold then it is assumed that the current channel is too noisy to maintain reliable communications and therefore the microprocessor 202 should attempt to identify another channel on which the base station 115 can operate.

It is noted that in step 308 the microprocessor 202 does not consider the information in column 272 pertaining to the RSSI signal level for correlated signals. Since the main transceiver 201 is operating simultaneously with the steps shown in FIG. 4, the main transceiver 201 and/or mobile terminals registered thereto is likely to be actively involved in communications on the current channel at such times when the RSSI levels are sampled for that particular channel. Hence, the RSSI levels during the correlated signals are not likely to represent noise or activities of another base station, but rather are likely to be indicative of operations of the base station itself.

If in step 308 the microprocessor 202 determines that the average RSSI level in column 270 does not exceed the predetermined threshold so as to indicate a low-noise condition, the microprocessor 202 proceeds to step 310. In step 310, the microprocessor 202 determines whether any of the other available channels exhibit even better noise conditions (i.e., less noise). More specifically, the microprocessor 202 looks to the average RSSI levels over the last five samples as reflected in column 270 of table 264 for each of the channels other than the channel on which the main transceiver 200 is currently operating on. The microprocessor 202 determines whether the average RSSI level in column 270 is more than a predetermined amount less than that of the current channel. For example, the microprocessor 202 determines if any of the other channels has an average RSSI level in column 270 which is more than 10 db less than that of the current channel. If no, it is assumed that the main transceiver 200 is currently on the optimum channel and the microprocessor 202 proceeds to step 312. In step 312 the base station 115 pauses in the same manner described above with respect to step 306 prior to returning to step 302 in order to reevaluate the noise conditions on each channel.

In the event the microprocessor 202 in step 310 determines that the noise conditions on another channel are significantly better, the microprocessor 202 proceeds to step 314 in which a new channel is selected according to a predefined selection criteria. Similarly, if in step 308 the microprocessor 202 determines that the noise conditions on the current operating channel of the main transceiver 200 exceed the predetermined threshold, the microprocessor 202 proceeds to step 314. In step 314 the microprocessor 202 carries out the following predefined selection criteria for selecting a new channel on which the main transceiver 200 is to operate:

a) with the exception of the current channel being utilized by the main transceiver 200, exclude from consideration any channels on which a beacon was received in the most recent sample as determined from the information in column 274;

b) among the remaining channels and again with the exception of the current channel, determine which channels (if any) have an average RSSI level for correlated signals with respect to the last five samples (as reflected in column 272) which is zero or near zero; then, to the extent any such channels exist, compare the channel having the lowest average RSSI level for non-correlated signals (column 270) with the current channel, and select as a new channel whichever has the lowest average RSSI level for non-correlated signals as represented in column 270;

c) to the extent that none of the remaining channels have an average RSSI level for correlated signals which is zero or near zero as determined in b), compare from among the remaining channels the channel having the lowest average RSSI level for non-correlated signals (column 270) with the current channel of the main transceiver 200, and select as a new channel whichever has the lowest average RSSI level for non-correlated signals as represented in column 270.

Thus, the predetermined selection criteria in step 314 is utilized by the microprocessor 202 to select a new channel on which the main transceiver 200 can operate. The particular criteria applied in step 314 can be modified to include different parameters, weighting of various criteria, etc., and the criteria explained above is intended merely to be exemplary. Furthermore, it should be appreciated that it is possible that the same channel on which the main transceiver 200 is currently operating on may be selected in step 314 as the new channel in the event the current channel continues to exhibit the best operating conditions as far as the channels available.

Following step 314, the microprocessor 202 proceeds to step 316. In step 316, the microprocessor 202 provides control information on line 208 which causes the main transceiver 200 to broadcast information on the current channel informing each of the mobile terminals 117 and wireless base stations 120 registered to the base station 115 of an upcoming channel change. Specifically, the main transceiver 200 broadcasts an information packet indicating to the mobile terminals 117 and wireless base stations which particular channel the base station 115 will be changing to and at what time such change will occur. A protocol for implementing such a channel change routine may be based on the type described in U.S. Pat. No. 5,142,550, although other protocols are certainly within the intended scope of the invention. Such information allows the mobile terminals 117 and wireless base stations 120 to reconfigure themselves in order to change together with the base station 115 to the newly selected channel. Alternatively, such devices may independently change after a time-out period in the event the mobile terminal or wireless base station did not receive the channel change notice. Following step 316, the microprocessor 202 proceeds to step 318 in which it causes the main transceiver 200 to switch to the newly selected channel at the time noted in the information broadcast in step 316. Thereafter, the microprocessor 202 proceeds to step 312 and then back to step 302 as the main transceiver 200 continues to operate on the new channel. The above procedure is then repeated.

In the event that the newly selected channel in step 314 ends up being the same channel as which the main transceiver 200 was currently operating on, there is no need for the microprocessor 202 to carry out steps 316 and 318. As a result, in the preferred embodiment the microprocessor 202 is programmed to detect in step 314 whether the new channel is the same as the current channel. If so, the microprocessor 202 bypasses steps 316 and 318 and proceeds directly to step 312 (not shown).

As will be appreciated, the process for evaluating the noise conditions of the various channels and instructing the main transceiver 200 to change channels as represented in FIG. 4 is carried out while the main transceiver 200 carries out normal operations. In other words, it is not necessary for the main transceiver 200 to go "off-line" as in the past so as to evaluate the noise conditions on other channels. Consequently, system performance is increased in the present invention.

Figure 5:
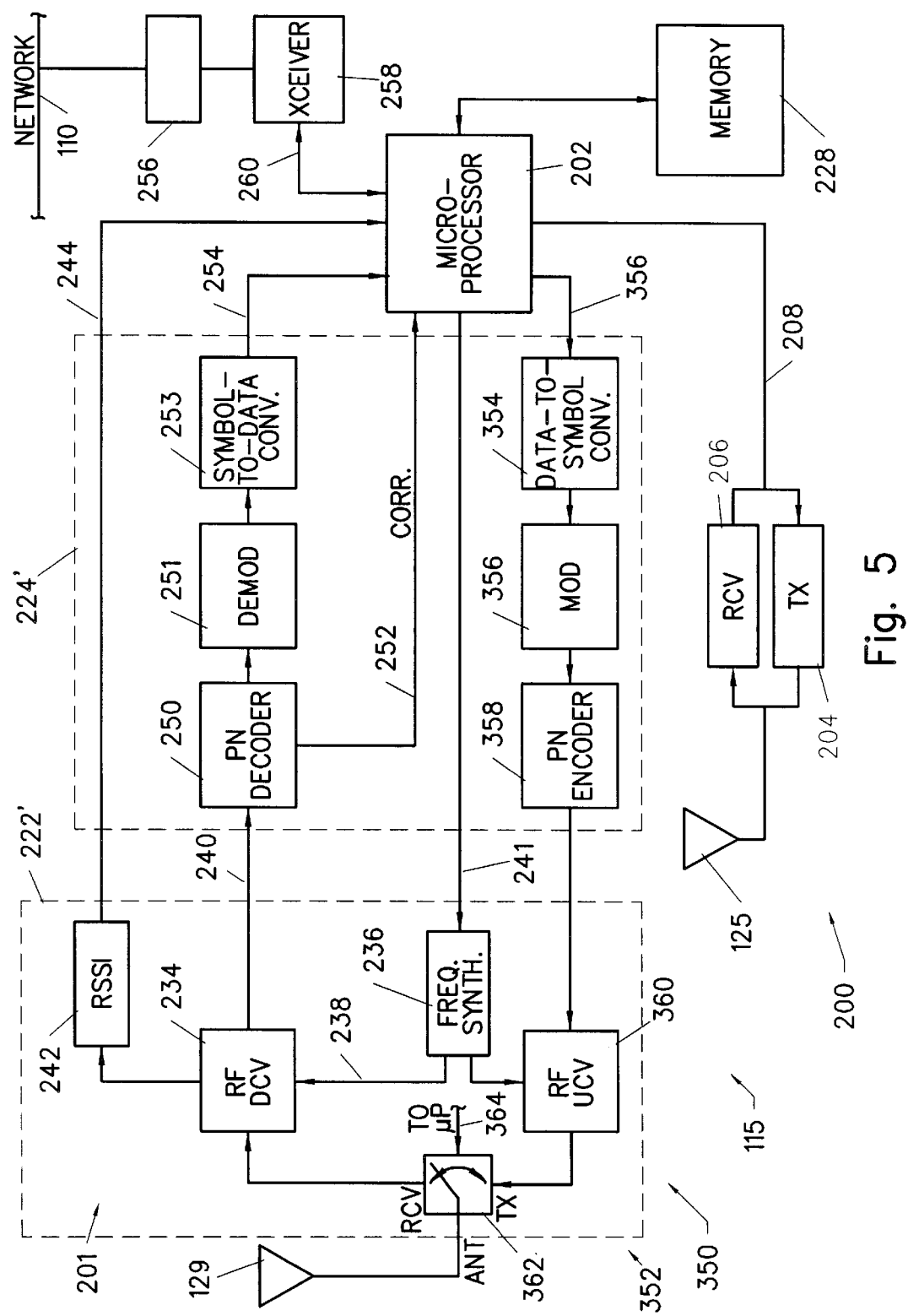
FIG. 5 is a block diagram of a base station including an auxiliary receiver and transmitter according to another embodiment of the present invention.

Referring now to FIG. 5, a different embodiment of the base station 115 is shown. In this embodiment, an auxiliary transmitter 350 is added to the base station 115 in addition to the auxiliary receiver 201 so as to form an auxiliary transceiver 352. The construction and operation of the main transceiver 200 and the auxiliary receiver 201 are substantially identical to the embodiment of FIG. 2. Consequently, only the relevant differences will be discussed herein. The auxiliary transmitter 350 provides the base station 115 with the ability to continue to communicate with any mobile terminals 117 or wireless base stations 120 which may have missed a broadcast message to change channels.

Although the mobile terminals 117 and wireless base stations typically are designed to start searching for another base station and/or channel upon realizing that the base station to which they were previously registered is no longer available (e.g., has changed to a different channel unbeknownst to the mobile terminal), the auxiliary transmitter 350 is used to actively seek out such mobile terminals and/or wireless base stations. For example, the auxiliary transmitter 350 may send out probes and wait for responses on all known channels in order to search for stray mobile terminals 117. Thus, after the main transceiver 200 has switched to a new channel, the auxiliary transceiver 352 is used to rebroadcast information to any remaining mobile terminals and/or wireless base stations informing them to change channels as is discussed more fully below. Additionally, to further optimize system performance, upon selecting a new channel in which to operate, the auxiliary transceiver 352 could swap in functionality with the main transceiver 200. Since the auxiliary transceiver 352 is already on the newly selected channel, no additional time is needed to wait for the main transceiver 200 to switch channels and the main transceiver 200 can immediately begin assuming the functions of the auxilliary transceiver 352.

As is shown in FIG. 5, the auxiliary transmitter 350 includes a data-to-symbol converter 354 which receives binary information to be transmitted from the microprocessor 202 via line 356. The data-to-symbol converter 354 converts the data from the microprocessor 202 into symbol data by performing a conversion inverse to that performed by the symbol-to-data converter 253 in the auxiliary receiver 201. The symbol data from the data-to-symbol converter 354 is then modulated by a modulator 356 which modulates the data based on the same modulation technique employed by the demodulator 251 in the auxiliary receiver 201. The modulated data is then encoded or spread by a PN encoder 358 using the same PN sequence employed by the PN decoder 250 discussed above.

The output of the PN encoder 358 is provided to an RF upconverter circuit 360 which mixes the modulated signal onto an RF carrier as determined by the microprocessor 202. More specifically, the RF upconverter circuit 360 is driven by the frequency synthesizer 236 in the same manner as the RF downconverter circuit 234 in order to transmit the modulated information selectively on either channel A, B, C, D or E. By providing a control signal on line 242, the microprocessor 202 causes the transceiver 352 to transmit and receive signals on a selected channel. The RF upconverter circuit 360 includes a mixer (not shown) which mixes the modulated signal from the modulator 358 onto a carrier frequency provided by the frequency synthesizer 236. The carrier frequency is the same frequency provided to the RF downconverter 234 which allows signals to be received on the same channel.

The modulated RF signal which is output from the RF upconverter circuit 360 is coupled to the transmit terminal of an antenna switch 362. The receive terminal of the antenna switch 362 is coupled to the input of the RF downconverter 234. The antenna 129 is coupled to the antenna terminal of the antenna switch 362. The position of the antenna switch 362 is controlled by the microprocessor 202 via a line 364. When the antenna switch 362 is in a receive position, the antenna 129 is coupled to the input of the RF downconverter circuit 234 so that signals may be received via the antenna 129 and the auxiliary receiver 201. When the antenna switch 362 is in a transmit position, the antenna 129 is coupled to the output of the RF upconverter circuit 360 so that signals may be transmitted via the antenna 129 and the auxiliary transmitter.

Figure 6:
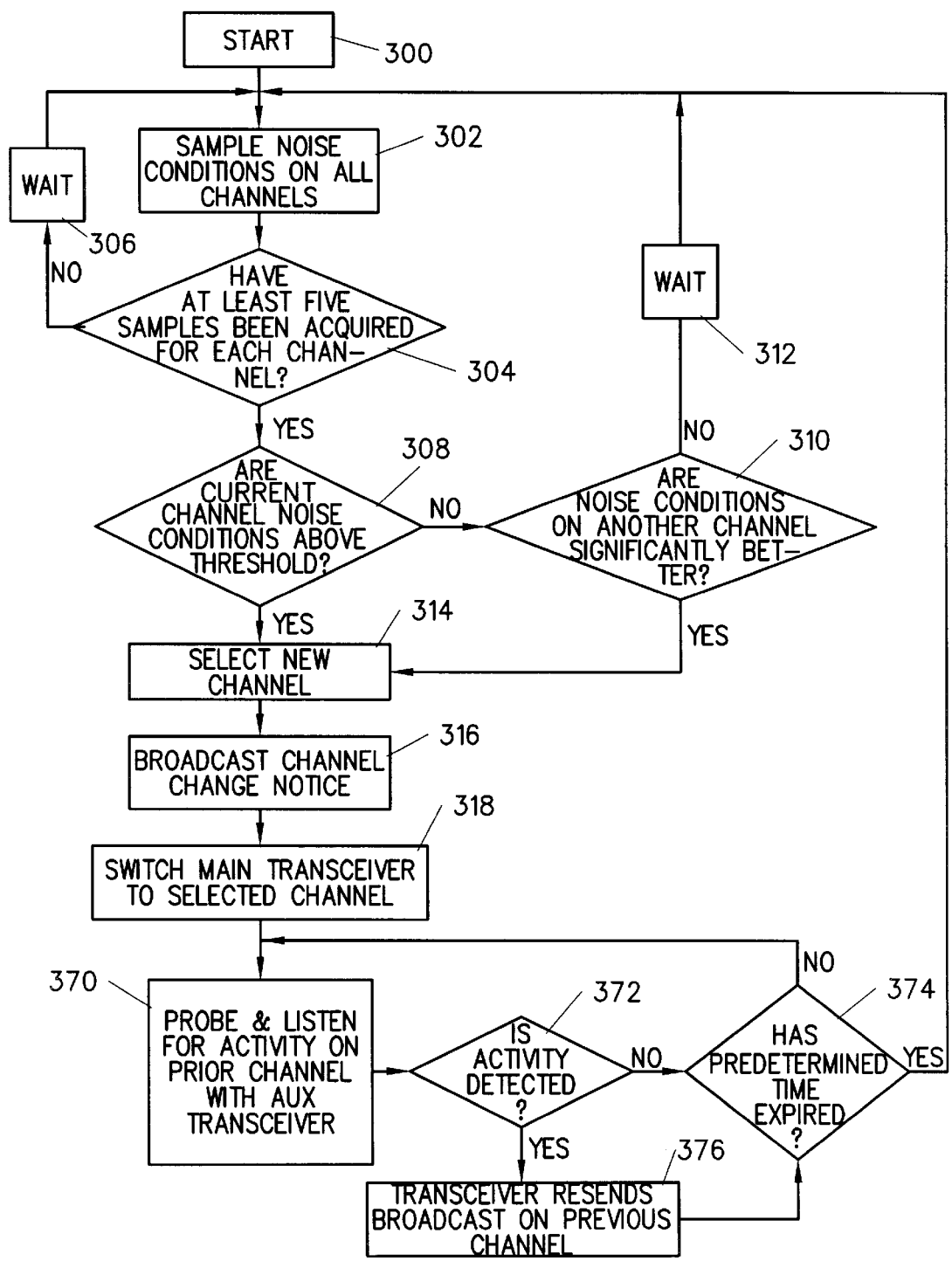
FIG. 6 is a flowchart suitable for programming the base station of FIG. 5 to select a new channel based on noise conditions in accordance with the present invention.

FIG. 6 is a flowchart representing the operation of the base station 115 according to the embodiment of FIG. 5 with respect to monitoring the noise conditions on all of the available channels. Steps 300 through 318 in FIG. 6 are identical to those described above in relation to the flowchart of FIG. 4. Such steps are carried out in the embodiment of FIG. 5 while the microprocessor 202 causes the antenna switch 362 to be in the receive position so that the noise conditions of the various channels can be evaluated. Following step 318, however, the microprocessor 202 in the embodiment of FIG. 5 proceeds to step 370. In step 370, the microprocessor 202 initially switches the antenna switch 362 to the transmit position. Next, the microprocessor 202 causes the auxiliary transmitter 350 to broadcast a probe on the same channel which the main transceiver 200 had been communicating on immediately prior to changing channels in step 318. As is conventional, the probe sent from mobile terminals 117 and/or wireless base stations 120 which may be searching for a base station 115 with which to register, contains information which prompts any base station 115 to respond by transmitting a response to the probe on the same channel. Then, still in step 370, the microprocessor 202 switches the antenna switch 326 to the receive position and begins "listening" for whether a response to the probe or any other activity is received via the receiver 201 to determine if any devices remain on the channel.

Following step 370 the microprocessor 202 determines in step 372 if a probe response or any other activity is received via the auxiliary receiver 201. A probe response in particular can be detected by the microprocessor 202 based on the content of any received signal as provided on line 254. Additionally, however, other activity on the channel can be detected simply by way of the correlation output on line 252. If the output on line 252 exhibits a degree of correlation which exceeds a predetermined threshold (e.g., is considered correlated), the received signal is considered to represent activity on the channel as opposed to random noise. If no probe response nor any other activity is detected in step 372, the microprocessor 202 proceeds to step 374 in which it determines if a predetermined amount of time has passed since the main transceiver 200 first switched to a new channel in step 318. Such predetermined amount of time is selected to be of sufficient duration to assume that any devices not responding to a probe during such period have now changed over to the new channel selected in step 314. For example, the predetermined amount of time in step 374 may be equal to the maximum amount of time required for a mobile terminal or wireless base station within the system to begin scanning on its own and identify a new base station and/or channel with which to register. The mobile terminal or wireless base station typically will begin to scan for such new base station and/or channel upon realizing that the transmissions of the mobile terminal or wireless base station are no longer being acknowledged by the previous base station.

If in step 374 the predetermined amount of time has not expired, the microprocessor 202 returns to step 370 in which the auxiliary transceiver 352 again broadcasts a probe and listens for a response or any other activity on the previous channel. If in step 374 the predetermined amount of time has passed, the microprocessor 202 assumes that no devices remain unregistered following the channel change. Consequently, the microprocessor 202 returns to step 302.

In the event a probe response is received or activity is otherwise detected as determined in step 372, this indicates that mobile terminals and/or wireless bases stations might exist which did not receive the channel change broadcast of step 316. Consequently, in such case the microprocessor 202 proceeds to step 376 in which the microprocessor 202 causes the auxiliary transceiver 350 to rebroadcast the channel change information on the previous channel.

Specifically, the microprocessor 202 switches the antenna switch 362 to the transmit position and causes the auxiliary transmitter 350 to broadcast again the information alerting any mobile terminals and wireless base stations of the change in channel of the main transceiver 200. Thereafter, the microprocessor 202 in step 376 returns the antenna switch 362 to the receive position and begins again to listen for a response or any other activity via the auxiliary receiver 201. Following step 376, the microprocessor 202 returns to step 374.

Accordingly, the embodiment of FIG. 5 provides for the auxiliary transceiver 352 to monitor noise conditions while the main transceiver 200 carries out normal communications. The auxiliary receiver 201 evaluates the noise conditions of the available channels, and the auxiliary transmitter 350 is utilized to contact any devices which may have inadvertently missed a channel change. As a result, channel changes may be carried out smoothly without the necessity of the main transceiver 200 having to go off-line temporarily. By utilizing an auxiliary transceiver 352 to access operating conditions, further enhancements may be added wherein the auxiliary transmitter 350 transmits test packets to base stations which respond with an indication of how well the base station was able to receive the transmitted packet. With this information the mobile device may better analyze operating conditions on a particular channel from both the mobile's position and the base station's position.

The present invention has been described above as it relates to the provision of an auxiliary receiver or transceiver in a base station. However, the invention can be implemented in a mobile terminal or a wireless base station as well. For example, it may be the case that a noise condition assessment is done by the auxiliary receiver or transceiver in a mobile terminal 117 or wireless base station 120. The information regarding whether a less noisy channel exists is transmitted from the mobile terminal 117 or wireless base station 120 to the base station 115 which is notified by the mobile terminal or wireless base station when and to which channel to switch. The base station 115 then broadcasts such information to any other mobile terminals and wireless base stations registered thereto so that all of the devices know when to change channels.

Figure 7:
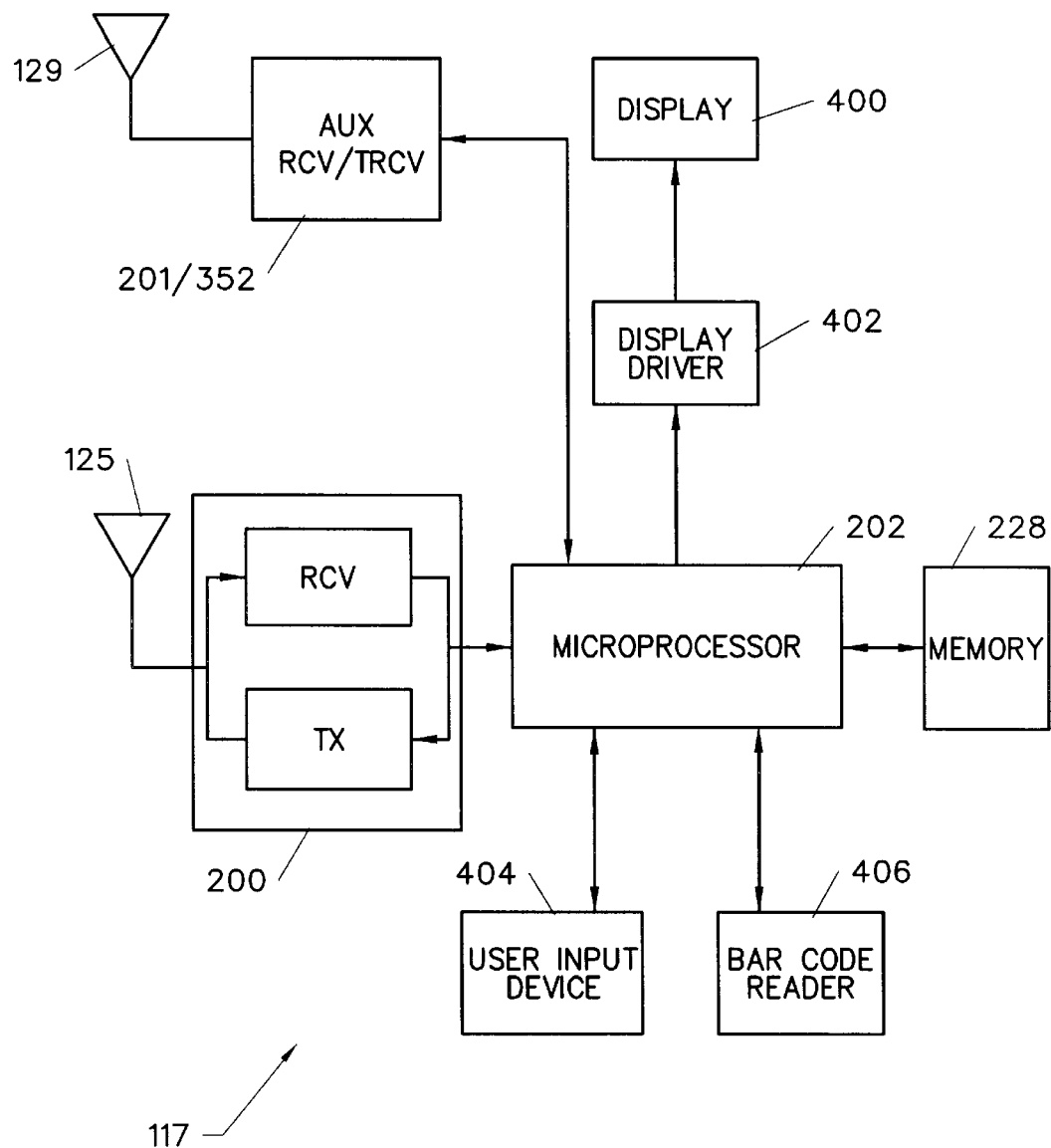
FIG. 7 is a block diagram of a mobile terminal including an auxiliary receiver or an auxiliary receiver and transmitter in accordance with the present invention.

FIG. 7 is a block diagram of a mobile terminal 117 in accordance with the invention. The mobile terminal 117, like either of the base station embodiments in FIGS. 2 and 5, includes an auxiliary receiver 201 or transceiver 352, a main transceiver 200, a microprocessor 202 and a memory 228. Instead of a hardwired connection to a system backbone, however, the mobile terminal 117 includes a display 400 driven by a display driver 402 which is coupled to the microprocessor 202. The display 400 is utilized by the mobile terminal 117 to display data which is received by or input into the mobile terminal 117 as is conventional. The mobile terminal 117 also includes a user input device 404 such as a keypad or the like for allowing a user to input data and/or commands.

In addition, the mobile terminal 117 includes a bar code reader 406 which allows the user to input information via a bar code.

The operation of the mobile terminal 117 with respect to evaluating noise conditions is substantially identical to the procedures described above in relation to FIG. 4 or 6. However, with respect to the operation as described in FIGS. 4 and 6, step 316 instead involves the mobile terminal 117 transmitting the channel change information and timing to the base station 115 to which it is registered. In the meantime, the main transceiver 200 is free to carry on conventional mobile terminal communications within the system.

Figure 8:
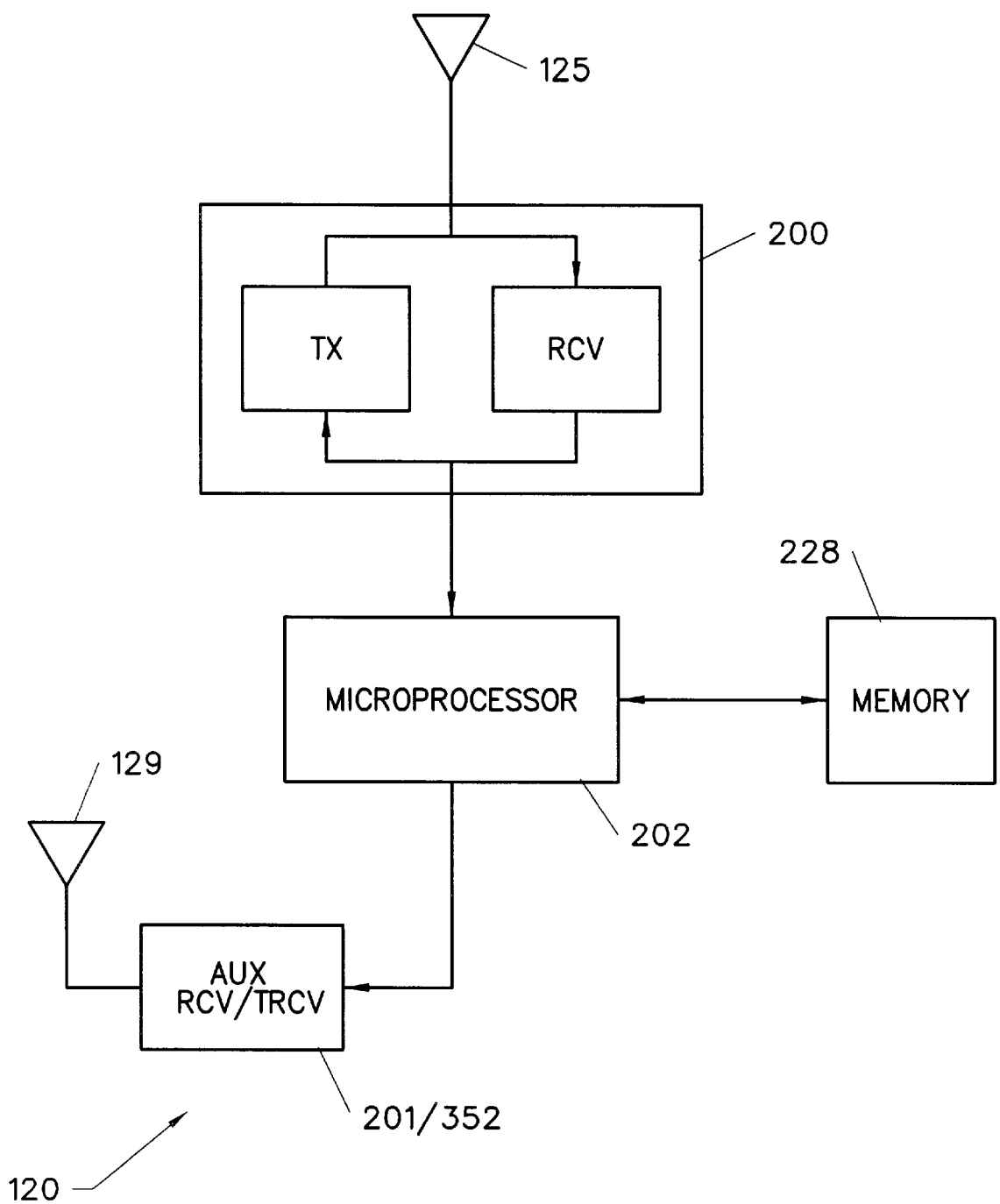
FIG. 8 is a block diagram of a wireless base station including an auxiliary receiver or an auxiliary receiver and transmitter in accordance with the present invention.

FIG. 8 shows an embodiment of a wireless base station 120 incorporating an auxiliary receiver 201 or transceiver 352. The construction of the wireless base station 120 is substantially identical to that of the base station 115 with the exception that the wireless base station 120 is not coupled to the system backbone 110. Instead, the wireless base station 120 serves as an intermediary with respect to communications between the mobile terminals 117 and the base stations 115. The operation of the wireless base station 120 with respect to evaluating noise conditions is substantially identical to the procedures described above in relation to FIG. 4 or 6. However, with respect to the operation as described in FIGS. 4 and 6, step 316 would be eliminated and upon deciding to change channels, the wireless base station 120 would simply register with a new base station which would in turn inform all other base stations of the new association, as is conventional.

In any of the above embodiments, a benefit is gained in that the communication link between the base stations and other devices need not be broken or interrupted so that an assessment of other potential channels to switch to can take place.

Although the invention has been shown and described with respect to certain preferred embodiments, it is obvious that equivalents and modifications will occur to others skilled in the art upon the reading and understanding of the specification. For example, the auxiliary receiver/transceiver and the main transceiver are described above as utilizing separate antennas. However, in another embodiment the same antenna may be shared by both. Furthermore, additional steps may be taken when evaluating the noise conditions. For example, immediately prior to the main transceiver 200 broadcasting the channel change notice in step 316 as shown in FIG. 4, the auxiliary receiver 201 may sample the noise conditions on the new channel one last time to ensure that conditions have not changed since last sampling the channel and determining that the channel provides the optimum conditions. Further, in order to better avoid problems associated with intermodulation, the auxiliary receiver/transceiver 201/352 may be configured to only take RSSI samples when the main transceiver 200 is not transmitting information.

According to another variation, during such time as the microprocessor 202 samples the noise conditions of each of the available channels, the microprocessor 202 is programmed to ascertain the data rate of the received signal based on the correlation output on line 252. As is conventional, the data rate between mobile terminals and base stations is increased in some systems in the event the mobile terminals and base stations are in close physical proximity and share a strong signal. This data rate information is stored for each respective channel in the table 264 and is used as part of the predetermined selection criteria performed in step 314 in order to select a new channel. Specifically, if the data rate exceeds a predetermined threshold thereby indicating that the source is relatively close to the base station seeking a new channel, the microprocessor 202 is programmed to give preference to other channels not exhibiting such a high data rate. This helps to avoid two base stations operating on the same channel in relatively close physical proximity.

In addition, it is noted that the present invention is not limited to a frequency agile DSSS system. The invention is useful in any system wherein a base station and a mobile terminal can communicate on two or more different communication channels. Also, although the analysis is performed as described above primarily with respect to noise level evaluation, changes between channels can also be based primarily on the amount of use of the other channels. For example, the auxiliary receiver determines which channel involves the least use as determined by the amount of time during each sample that a correlated signal is received as determined by the correlated output on line 252.

Figure 9:
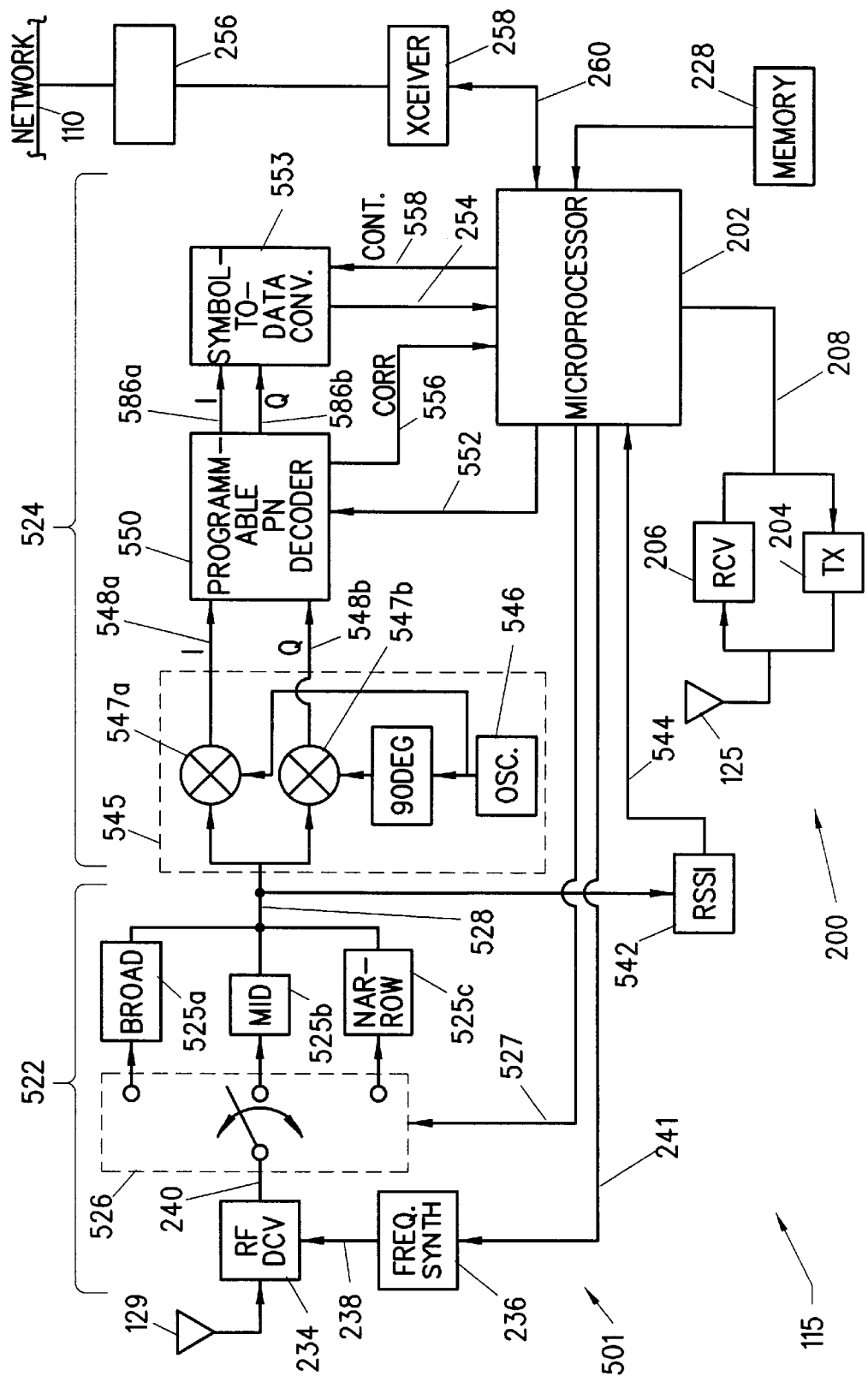
FIG. 9 is a is a block diagram of a base station including an auxiliary receiver in accordance with another example of the present invention.

FIG. 9 represents a block diagram of a given base station 115 within the system 100 according to another embodiment of the present invention. The base station includes a main transceiver 200 which is identical to that described above in connection with the embodiment of FIG. 2, and an auxiliary receiver 501 which are each controlled by the microprocessor 202. Components in the base station 115 of FIG. 9 which share the same reference numerals as those described above in connection with the embodiment of FIG. 2 are substantially identical except as described herein. Accordingly, detail with respect to such common components is now omitted for sake of brevity.

The auxiliary receiver 501 as shown in FIG. 9 is provided in the base station 115 to scan substantially continuously the channels A through E on which the main transceiver 200 is not currently operating on in order to evaluate noise and/or use conditions. Thus, as in the previous embodiments the provision of the auxiliary receiver 501 avoids the necessity of the receiver 206 in the main transceiver 200 having to go "off-line" with respect to the mobile terminals 117 in order to evaluate noise conditions and/or availability on the other channels. Consequently, overall system performance is greatly enhanced as will be appreciated.

As is discussed more fully below, the auxiliary receiver 501 provides additional flexibility with respect to the various communication parameters which may be evaluated by the auxiliary receiver. For example, the auxiliary receiver 501 can analyze the availability of other channels based on not only frequency, but other communication parameters such as PN code sequence, chipping rate, modulation complexity (e.g., BPSK or QPSK), and frequency band. Thus, while the main transceiver 200 is operating on a given channel communicating with various mobile terminals 117 registered thereto, the auxiliary receiver 501 can scan through available channels based on any one or more of these parameters.

The auxiliary receiver 501 includes a radio frequency (RF) section 522 and a modulation section 524. As is described more fully below, the auxiliary receiver 501 is controlled by the microprocessor 202 with respect to the operation of the RF section 522 and the modulation section 524.

Signals which are received by the auxiliary antenna 129 are provided to the RF downconverter circuit 234 included in the RF section 222. As in the embodiment of FIG. 2, the RF downconverter circuit 234 is driven by a frequency synthesizer 236 which produces an output frequency on line 238 which is input to the RF downconverter 234. The RF downconverter circuit 234 includes a mixer (not shown) which mixes the incoming signals from the antenna 129 down to a corresponding base band signal provided on line 240. The frequency synthesizer 236 is controllable by the microprocessor 202 via line 242 in order to control the specific channel on which the receiver 201 receives a signal. Specifically, the microprocessor 202 provides control information to the frequency synthesizer 236 which causes the synthesizer to selectively produce an output frequency on line 238 corresponding to the carrier frequency of any of channels A through E. Accordingly, by adjusting the output frequency of the frequency synthesizer 236 the microprocessor 202 can determine whether the receiver 201 receives signals on channel A, B, C, D or E.

In the present embodiment, the RF section 522 also includes a bank of low-pass filters 525a–525c and a switch 526 for selecting from among the respective filters 525a–525c. More specifically, the base band signal on line 240 is coupled to the center pole of the switch 526. The position of the switch 526 is controlled by the microprocessor 202 via line 527 such that the signal on line 240 is selectively input to either filter 525a, 525b or 525c. The outputs of each of the filters 525a–525c are each tied together to line 528 which serves as the input to the modulation section 524.

According to the exemplary embodiment, it is assumed that each of the channels A thru E utilized in the system have approximately the same bandwidth (e.g., 20 MHz). The purpose of the bank of filters 525a–525c is to provide selected coverage of one or more channels based on the output of the RF downconverter circuit 234. For example, filter 525a as shown in FIG. 9 is a "broad" filter having a bandwidth of 44 MHz which is wide enough to encompass at least portions of two or more channels in the system 100. Filter 525b is a "mid" filter having a bandwidth of 22 MHz which is approximately equal to the bandwidth of one channel. Filter 525c is a "narrow" filter having a bandwidth of 1 MHz. As is described below in connection with FIGS. 11 and 12, by selectively adjusting the frequency of the frequency synthesizer 236 and the selecting between the filters 525a–525c, the microprocessor 202 can ascertain quickly which channels are available in a given band. Most advantageously, it is not necessary for the microprocessor 202 to check each possible available channel individually. Rather, by utilizing the broad filter 525a the microprocessor 202 can check a large portion of an available band having two or more possible channels at the same time.

The output of the filters 525a–525c on line 528 is coupled to an RSSI circuit 542 which produces an output on line 544 indicative of the RSSI level of any signals received through a selected filter 525a–525c at a given time. The output of the RSSI circuit 542 is provided to the microprocessor 202 which samples the output as described below in order to evaluate the conditions of each particular channel A through E.

The signal provided on line 528 is input to a quadrature demodulator 545 included in the modulator section 524. The quadrature demodulator 545 is conventional in design and includes an oscillator 546 which provides a sinusoidal signal to mixers 547a and 547b, the signal provided to mixer 547b being ninety degrees out of phase of the signal provided to the mixer 547a.

The frequency of the oscillator 546 is equal to a frequency which is known to be used in the system 100 for BPSK or QPSK modulation on various channels, for example. The received signal on line 528 is input to each of the mixers 547a and 547b so as to produce the I and Q components of the received signal on lines 548a and 548b, respectively.

The I and Q components of the received signal are input to a programmable PN decoder 550 which is designed to despread the I and Q component according to the particular PN sequence provided by the microprocessor 202 via line 552. As is discussed more fully below in connection with FIG. 10, the PN decoder 550 is programmable in the sense that the microprocessor 202 can instruct the PN decoder to apply different PN code sequences via line 552. Therefore, provided it is known which possible PN code sequences may be used within the system on different channels, the microprocessor 202 can be programmed to cause the auxiliary receiver 501 to "listen" on particular channels for particular PN code sequences. Furthermore, the microprocessor 202 is able to adjust the chipping rate of the PN decoder 550 via line 552. Consequently, the microprocessor 202 can be programmed to cause the auxiliary receiver 501 to attempt to receive signals at various chipping rates known to be utilized within the system 100. Provided the auxiliary receiver 501 does not detect any unacceptable noise or other activity, the microprocessor 202 can be programmed to instruct the main transceiver 200 to switch over to a new channel in a manner similar to that described above. The PN decoder 550 provides as an output the decoded I and Q signals to a programmable symbol-to-data converter 553.

The PN decoder 550 also provides as an output on line 556 an indication of the degree of correlation between the I and Q components of the received signal and the PN code sequence used to despread the received signal. By analyzing the degree of correlation in the received signal as determined from line 556, the microprocessor 202 is able to determine if the received signal represents actual communication within the system 100 or noise, for example. The symbol-to-data converter 553 is programmable via line 558 so as to employ selectively different symbol-to-data conversions (e.g., known BPSK or QPSK constellation plane conversions used in the system 100). This is accomplished, for example, by a look-up table (not shown) included in the converter 553 which is segmented into different conversion sections for the I and Q data. The signal on line 558 serves as an address to select the desired conversion section for a particular BPSK or QPSK constellation plane, for example.

Again, the output of the symbol-to-data converter 553 on line 254 represents any system data which may have been included in the received signal. Such data is coupled to the microprocessor 202 where it is evaluated for content if desired.

Figure 10:
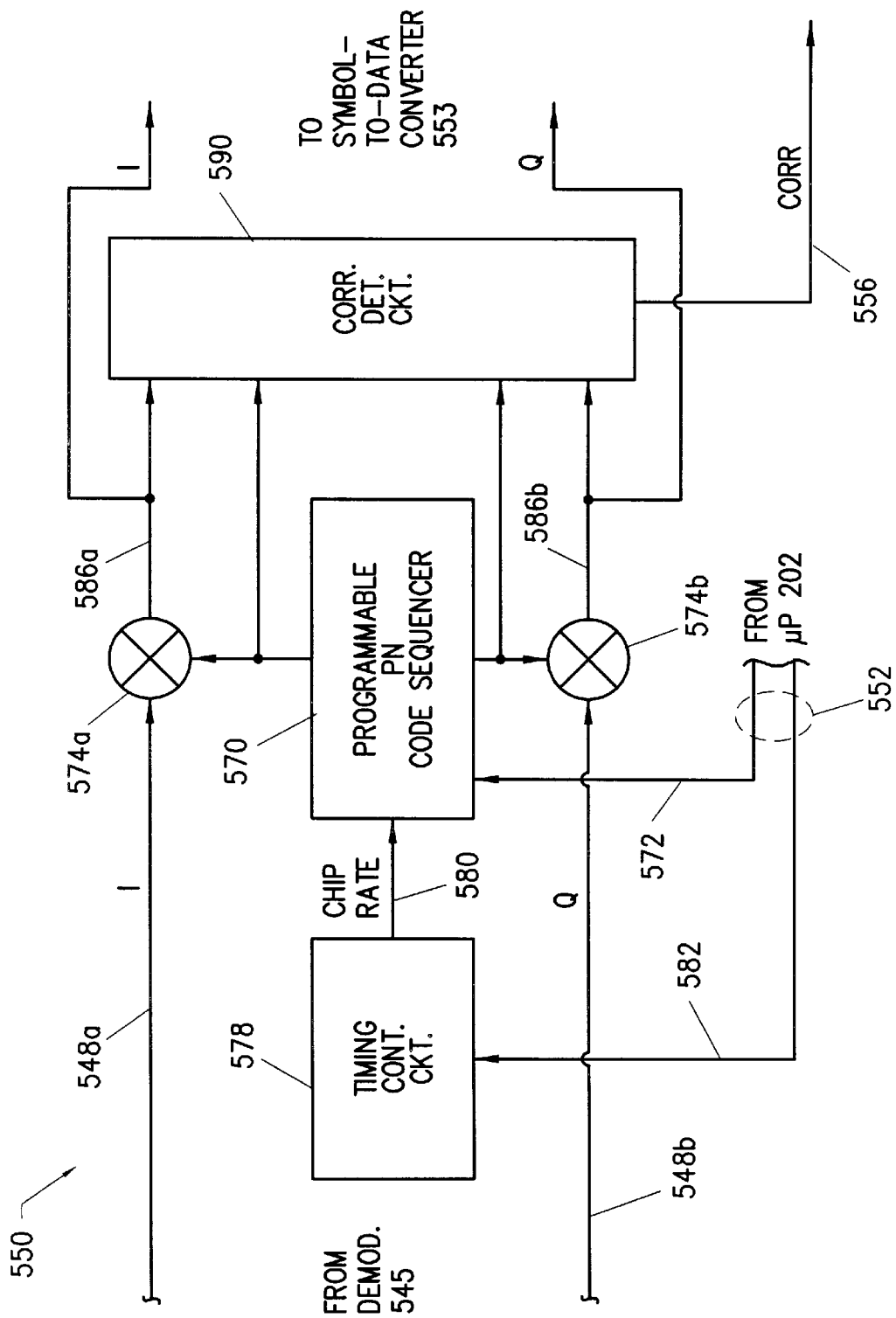
FIG. 10 is a block diagram of a programmable PN decoder included in the auxiliary receiver shown in FIG. 9 in accordance with the present invention.

FIG. 10 presents a detailed block diagram of the programmable PN decoder 550. Specifically, the PN decoder 553 includes a programmable PN code sequencer 570 which receives a particular PN code sequence provided by the microprocessor 202 on line 572. The PN code sequencer 570 provides the PN code sequence to despreaders 574a and 574b for mixing with the I and Q signals on lines 548a and 548b, respectively. The programmable PN code sequencer 570 receives as a control input a chip rate select signal provided from a timing controller 578 via line 580. The chip rate select signal from the timing controller 578 determines the chipping rate of the PN code sequence produced by the sequencer 570. The timing controller 578 is connected to the microprocessor 202 via line 582 and is controlled thereby such that the microprocessor 202 can control the chipping rate applied by the PN code sequencer 570.

The despread I and Q components of the received signal are output on lines 586a and 586b, respectively, to the symbol-to-data converter 553 for conversion. In addition, the despread I and Q components are input to a correlation detection circuit 590 together with the PN code sequence output by the PN code sequencer 570 used in despreading the I and Q components. The correlation detection circuit 590 applies conventional correlation techniques to evaluate the degree of correlation between the I and Q components and the selected PN code sequence. Based on such evaluation, the correlation detection circuit 590 outputs to the microprocessor 202 on line 556 an indication of the degree of correlation both with respect to the I component and the Q component.

Figure 11:
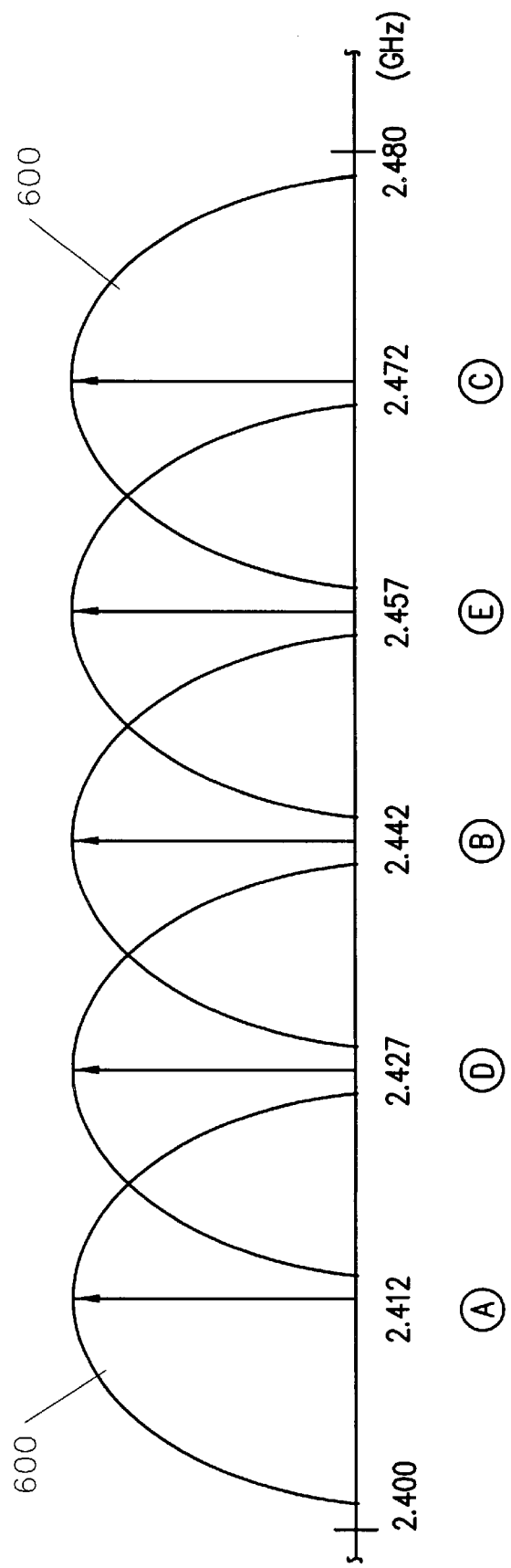
FIG. 11 is a spectrum diagram illustrating available channels according to the exemplary embodiment.

Referring now to FIG. 11, the application of the auxiliary receiver 501 of FIG. 9 will now be described in the context of a system 100 which operates in the 2.4–2.48 GHz band. For sake of example, it is assumed that different devices (e.g., base stations and mobile terminals) in the system are operating on one of five different frequency channels A–E. The center frequencies of those channels are known to be 2.412, 2.442, 2.472, 2.427 and 2.457 GHz, respectively. It also is known that each of the devices operate with a channel bandwidth of approximately 20 MHz as represented by curves 600. Such bandwidth may be achieved by a particular PN code length, chipping rate, etc.

By adjusting the various components within the auxiliary receiver 501, the microprocessor 202 can determine whether a particular channel with given parameters (e.g., PN code sequence, chipping rate, modulation complexity) is available. The microprocessor 202 is programmed to control the various components in the manner exemplified below in order that such determinations are made.

(A) Determining Available Channels Based on Multiple Filters

Figure 12:
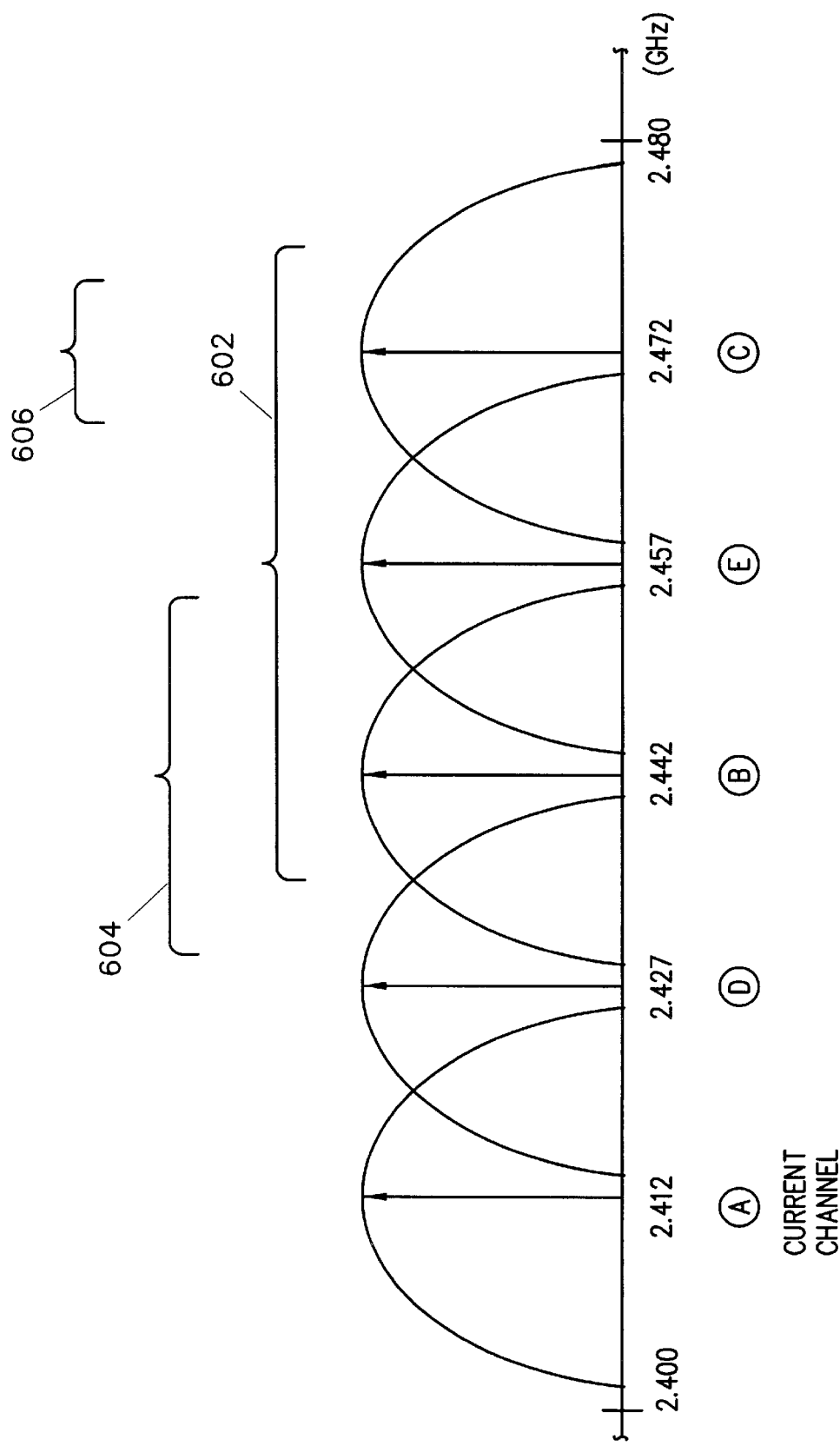
FIG. 12 is a spectrum diagram showing the use of multiple filters to identify clear channels according to the present invention.

Referring to FIG. 12, suppose for example that the main transceiver 200 is operating on channel A. In order to search for another available channel (due to noise on channel A, for example), the auxiliary receiver 501 is controlled in the following manner. Specifically, the microprocessor 202 causes the frequency synthesizer 236 to output a carrier frequency of 2.457 GHz (corresponding to channel E). In addition, the microprocessor 202 causes the switch 526 to connect line 240 to the broad filter 525a. Consequently, the received signal on line 528 will be within the band represented by bracket 602 in FIG. 12. At such time, the microprocessor 202 samples the output of the RSSI signal on line 544 which is indicative of the activity within the band 602.

Since the filter 525a is 44 MHz wide, the band 602 includes at least a portion of each of channels D, B, E and C. If the RSSI signal on line 544 indicates no activity (whether it be due to noise or usage of one or more of the channels by another device), the microprocessor 202 is programmed to conclude that any of channels D, B, E and C is available. The microprocessor 202 can then select one of the channels and instruct the main transceiver 200 to switch to the newly selected channel in the same manner described above.

If the RSSI signal on line 544 indicates that there is activity within the band 602, the microprocessor 202 will need to evaluate the available band more narrowly to determine if available channels exist. Therefore, for example, the microprocessor 202 is programmed to adjust the output of the frequency synthesizer 236 so as to be 2.442 GHz (channel B). At the same time, the microprocessor 202 causes the switch 526 to connect the signal on line 240 to the mid filter 525b. As a result, the received signal on line 528 will be within the band represented by bracket 604.

As shown in FIG. 12, the band 604 encompasses at least a portion of channels D, B and E, but does not encompass any portion of channel C. Again, the microprocessor 202 samples the RSSI signal on line 544 to determine whether there is any activity in the band 604. If not, it is concluded by the microprocessor 202 that any of channels D, B and E are available and that channel C was likely the source of the activity and was already in use (or experiencing noise). If the RSSI signal still indicates activity in the received signal, the microprocessor 202 is programmed to scan even more narrowly by evaluating a particular channel. Therefore, for example, the microprocessor 202 causes the frequency synthesizer 236 to output a signal corresponding to the carrier frequency of 2.472 GHz (channel C). In addition, the microprocessor 202 causes the switch 526 to connect the output on line 240 to the narrow filter 525c. As a result, the output on line 528 will correspond to the band represented by bracket 606 in FIG. 12. In this manner, the output of the RSSI detector circuit 542 will represent specifically the activity about the carrier frequency of channel C which still may be available.

Thus, one aspect of the invention involves initially scanning the available band in segments which encompass multiple channels. In this manner, the microprocessor 202 can ascertain whether any other channels are available more quickly than if each channel were to be evaluated separately. In the event an available channel cannot be ascertained based on a broad scan, the band is evaluated with progressively more narrow segments such that a conclusion can be reached as to channel availability.

The precise selection of filters 525a–525c and the selection of carrier frequencies by the auxiliary scanner will of course depend on which channel is currently being used by the main transceiver. Accordingly, it will be appreciated that FIG. 12 is intended to be merely exemplary. The microprocessor 202 is programmed to apply an appropriate selection of filters and carrier frequencies depending on the various conditions and results as will be appreciated.

(B) Determining Availability of Different Channels With Respect to PN Sequence

The auxiliary receiver 501 can also monitor the band for the availability of different channels with respect to PN sequence. Suppose, for example, the various mobile terminals and base stations within the system are known to operate on channels A-E using different PN sequences at known chipping rates. The microprocessor 202 positions the switch 526 such that the signal on line 240 is filtered by the mid filter 526 so as to pass one channel at a time. The microprocessor 202 then causes the frequency synthesizer 236 to output the carrier frequency of the channel of interest (e.g., A thru E). Next, the microprocessor 202 causes the programmable PN decoder 550 to decode the received signal according to one or more different PN code sequences (and respective chipping rates) known to be utilized within the system 100. If the correlation signal on line 556 indicates a high degree of correlation in the received signal, the microprocessor 202 determines that the channel with the particular PN sequence is being utilized. The microprocessor 202 can then evaluate another channel/PN sequence combination until an available channel is located.

(C) Determining Different Channels With Respect to Chipping Rate

The auxiliary receiver 501 can also monitor the band for the availability of different channels with respect to PN sequence chipping rate. Suppose, for example, the various mobile terminals and base stations within the system are known to operate on channels A–E using different chipping rates in association with known PN code sequences. Again the microprocessor 202 positions the switch 526 such that the signal on line 240 is filtered by the mid filter 526 so as to pass one channel at a time. The microprocessor 202 then causes the frequency synthesizer 236 to output the carrier frequency of the channel of interest (e.g., A thru E). Next, the microprocessor 202 causes the programmable PN decoder 550 to decode the received signal according to one or more different chipping rates (and respective PN code sequences) known to be utilized within the system 100. If the correlation signal on line 556 indicates a high degree of correlation in the received signal, the microprocessor 202 determines that the channel with the particular chipping rate is being utilized. The microprocessor 202 can then evaluate another channel/chipping rate combination until an available channel is located.

(D) Determining Different Channels With Respect to Modulation Complexity

In addition, the auxiliary receiver 501 can monitor the band for the availability of different channels with respect to modulation complexity. Suppose, for example, the various mobile terminals and base stations within the system are known to operate on channels A–E using different modulation schemes (e.g., BPSK or QPSK) with known PN code sequences, chipping rates, etc. Again the microprocessor 202 positions the switch 526 such that the signal on line 240 is filtered by the mid filter 526 so as to pass one channel at a time. The microprocessor 202 then causes the frequency synthesizer 236 to output the carrier frequency of the channel of interest (e.g., A thru E). Next, the microprocessor 202 causes the programmable PN decoder 550 to decode the received signal according to the known chipping rates and respective PN code sequences. In addition, the microprocessor 202 controls the symbol-to-data converter 553 via line 558 to select a particular conversion scheme (e.g., BPSK or QPSK constellation plane). If the data which is produced on line 254 is intelligible as determined by the microprocessor 202, the microprocessor 202 determines that the channel with the particular modulation scheme is being utilized. The microprocessor 202 can then evaluate another channel/modulation scheme combination until an available channel is located.

In an alternate embodiment in which the modulation schemes are conventional BPSK and QPSK where the BPSK symbols are on one axis and the QPSK symbols are not on one axis in the constellation plane, BPSK and QPSK modulation can be detected in another manner. Specifically, if only one of the I and Q components is correlated as determined from line 556, BPSK can be identified in the received signal. On the other hand, if both the I and the Q components are correlated as determined from line 556, QPSK can be identified.

It will be appreciated that the auxiliary receiver 501 has flexibility with respect to many parameters, and not all are necessary in any given embodiment. Also, it will be appreciated that in many instances (particularly those in which decisions are based on correlation) it is necessary that many of the parameters be known so that other parameters can be evaluated.

Figure 13:
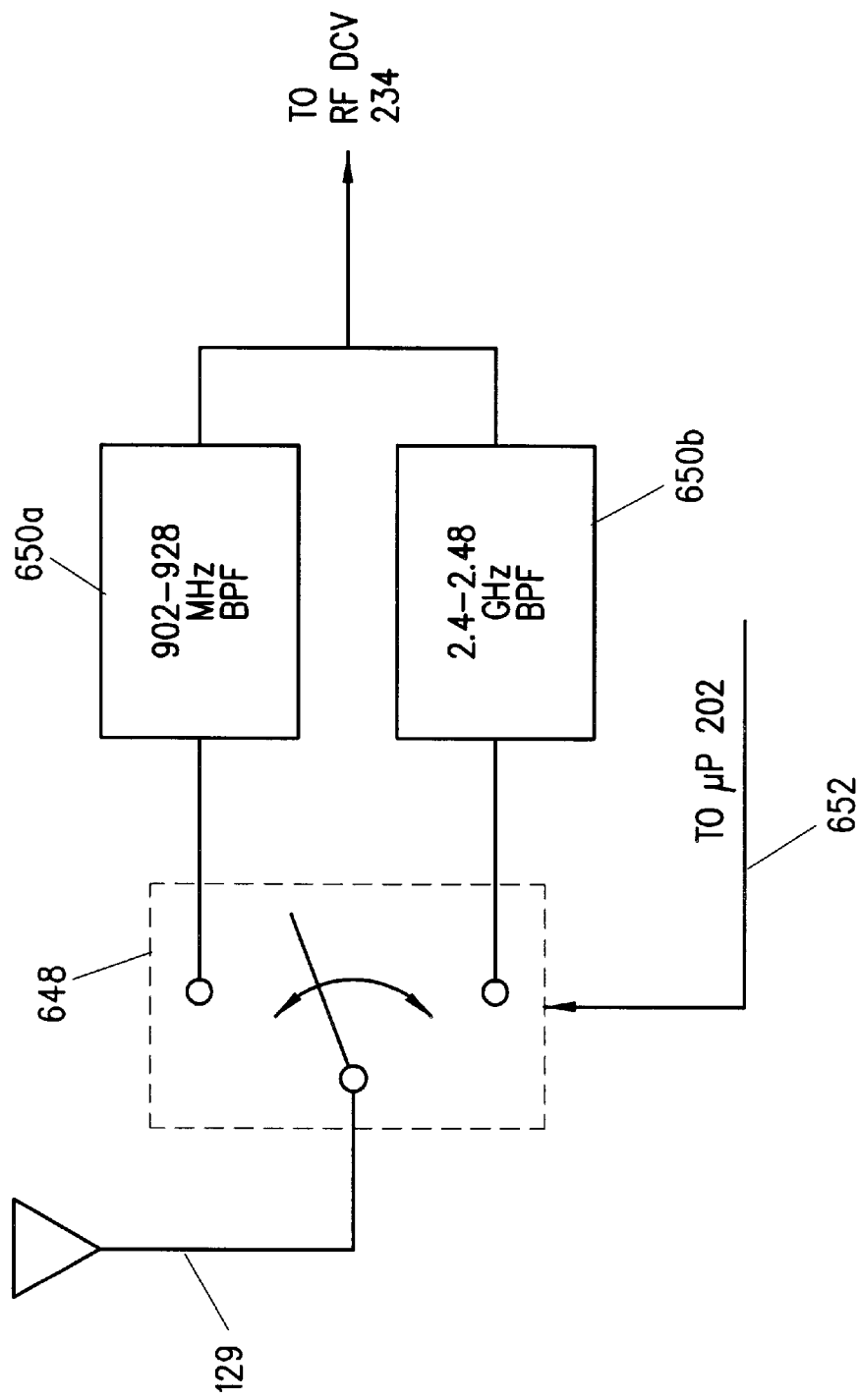
FIG. 13 is a block diagram of a switchable front end filter for selecting different bands in accordance with another embodiment of the present invention.

FIG. 13 shows in relevant part another embodiment of the auxiliary receiver 501 which includes a switch 648 and a set of filters 650a and 650b between the antenna 129 and the RF downconverter circuit 234. The position of the switch 648 is controlled by the microprocessor 202 via line 652. In one position, the switch 648 couples signals received by the antenna 129 through filter 650a which is a bandpass filter for the band 902–928 MHz. In the other position, the switch 648 couples signals received by the antenna 129 through filter 650b which is a bandpass filter for the band 2.4–2.48 GHz. In this manner, the microprocessor 202 can control whether the auxiliary receiver 501 scans for available channels in the 902–928 MHz band or the 2.4–2.48 GHz band. The remainder of the auxiliary receiver 501 operates in accordance with the procedure described above. Of course, it will be appreciated that different carrier frequencies will be utilized. Also, it would be desirable to also switch between a different set of broad, mid and narrow filters in view of the different bandwidths. Although the auxiliary receiver 501 is described primarily in the context of being utilized in a base station, it is also within the contemplated scope of the invention to use such auxiliary receiver in a mobile terminal similar to the embodiment of FIG. 7. In such case, the primary function of the auxiliary receiver is preferably to identify those channels which are in use as opposed to identifying which channels are free of activity.

The present invention includes all such equivalents and modifications, and is limited only by the scope of the following claims.

What is claimed is:

1. A wireless communication device, comprising:
    a transceiver including a transmitter and a receiver for transmitting and receiving wireless communications selectively on any of a plurality of channels; and
    an auxiliary receiver for scanning substantially continuously to evaluate one of the plurality of channels while the transceiver communicates on another of the plurality of channels, and for providing information based on communication conditions to the transceiver;
    wherein the auxiliary receiver is operatively configured to evaluate the communication conditions by selectively evaluating at least one of different frequency bands, PN code sequences, chipping rates, and modulation complexities.

2. The device of claim 1, wherein the auxiliary receiver selectively evaluates different frequency bands.

3. The device of claim 2, wherein the auxiliary receiver evaluates the different frequency bands by selectively switching between filters having different bandwidths.

4. The device of claim 3, wherein the filters include at least one filter which is broad enough to include at least a portion of two different channels.

5. The device of claim 1, wherein the auxiliary receiver selectively evaluates different PN code sequences.

6. The device of claim 5, wherein the auxiliary receiver comprises a programmable PN decoder for providing different PN code sequences.

7. The device of claim 1, wherein the auxiliary receiver selectively evaluates different chipping rates.

8. The device of claim 7, wherein the auxiliary receiver comprises a programmable PN decoder for providing different chipping rates.

9. The device of claim 1, wherein the auxiliary receiver selectively evaluates different modulation complexities.

10. The device of claim 9, wherein the auxiliary receiver comprises a programmable symbol-to-data converter for providing different modulation schemes.

11. The device of claim 10, wherein the different modulation schemes include BPSK and QPSK.

12. The device of claim 1, wherein the transceiver transmits and receives the wireless communications on a channel selected from among the plurality of channels based on the information provided from the auxiliary receiver.

13. The device of claim 1, wherein the auxiliary receiver evaluates noise conditions on the at least one of the plurality of channels.

14. The device of claim 13, wherein the noise conditions are based on a received signal strength indicator (RSSI) signal obtained by the auxiliary receiver.

15. A base station comprising the device of claim 1, and further including means for connecting the base station to a system backbone in a wireless communication network.

16. In a wireless communication device including a transceiver having a transmitter and a receiver for transmitting and receiving wireless communications on any of a plurality of channels, and an auxiliary receiver, a method for communicating comprising the steps of:
    the transceiver communicating on a channel selected from the plurality of channels;
    the auxiliary receiver scanning substantially continuously to evaluate communication conditions on each of the plurality of channels while the transceiver communicates on the selected channel, and
    selecting another channel for the transceiver to communicate on from among the plurality of channels based on the information provided by the auxiliary receiver,
    wherein the auxiliary receiver is operatively configured to evaluate the communication conditions by selectively evaluating at least one of different frequency bands, PN code sequences, chipping rates, and modulation complexities.

17. The method of claim 16, wherein the wireless communication device is a base station used in a cellular communication network.

18. The method of claim 16, wherein the wireless communication device is a mobile terminal used in a cellular communication network.

* * * * *